(12) United States Patent
Mehrvar et al.

(10) Patent No.: US 9,831,978 B1
(45) Date of Patent: Nov. 28, 2017

(54) METHOD AND SYSTEM FOR CONTROLLING SPECTRAL OCCUPANCY

(71) Applicants: Hamid Mehrvar, Ottawa (CA); Mohammad Mehdi Mansouri Rad, Kanata (CA); Christopher Janz, Dunrobin (CA)

(72) Inventors: Hamid Mehrvar, Ottawa (CA); Mohammad Mehdi Mansouri Rad, Kanata (CA); Christopher Janz, Dunrobin (CA)

(73) Assignee: Huawei Technologies Co., Ltd., Kanata, ON ( * ) Notice: Subject to any disclaimer, the term of this patent is extended or adjusted under 35 U.S.C. 154(b) by 0 days.

(21) Appl. No.: 15/250,202

(22) Filed: Aug. 29, 2016

(51) Int. Cl.
*H04B 10/2507* (2013.01)
*H04J 14/02* (2006.01)
*H04B 10/27* (2013.01)

(52) U.S. Cl.
CPC .......... *H04J 14/0241* (2013.01); *H04B 10/27* (2013.01); *H04J 14/021* (2013.01); *H04J 14/0221* (2013.01)

(58) Field of Classification Search
CPC .......................... H04J 14/0221; H04B 10/2507
See application file for complete search history.

(56) References Cited

U.S. PATENT DOCUMENTS

| 6,907,201 B1 | 6/2005 | Frankel |
| 6,941,075 B2 * | 9/2005 | Michishita .......... H04J 14/0221 398/160 |
| 2006/0239604 A1 | 10/2006 | Marhic et al. |
| 2013/0058647 A1 * | 3/2013 | Boertjes ............. H04B 10/0775 398/38 |

FOREIGN PATENT DOCUMENTS

| CN | 101197626 A | 6/2008 |
| CN | 101207443 A | 6/2008 |

OTHER PUBLICATIONS

International Search Report dated Feb. 4, 2017 for corresponding International Application No. PCT/CN2016/105109 filed Nov. 8, 2016.

* cited by examiner

*Primary Examiner* — Shi K Li

(57) ABSTRACT

Aspects of the disclosure provided systems and methods which mitigate negative effects of Spectral Hole Burning when spectral changes are made. Embodiments of the disclosure are directed to methods and systems which preform spectral holes for the range of wavelength channels expected to be used in the optical communication system. In some embodiments this is achieved by controlling the network to ensure optical power is provided at each of a set of idle tone wavelengths distributed across the spectral band used in the optical communication system. In some embodiments a routing and spectrum assignment function satisfies new service requests while maintaining power to the set of idle tone wavelength functions. In some embodiments a network control function configures Reconfigurable Optical Add/Drop Multiplexers to broadcast idle tone wavelengths to provide power to each idle tone in each section.

30 Claims, 20 Drawing Sheets receiving a spectral change request for a connection between a first network element (NE) and a second NE — 1501 implementing the change request while maintaining optical power for a set of idle tone wavelength channels distributed across a spectral band used in the optical communication system — 1502

METHOD AND SYSTEM FOR CONTROLLING SPECTRAL OCCUPANCY

TECHNICAL FIELD

This disclosure relates to the field of optical networks in general, and to the field of changing spectral occupancy (adding or deleting channel signal wavelengths) to a system which uses multiple wavelengths and optical amplifiers.

BACKGROUND

Wavelength Division Multiplexing (WDM) systems utilize multiple channel signal wavelengths to carry multiple signals in an optical fiber. Dense WDM (DWDM) and Coarse WDM (CWDM) and other systems which utilize WDM will be collectively referred to as WDM systems. Optical communication systems (OCS) typically utilize optical amplifiers, such as erbium-doped fiber amplifiers (EDFA), in each section of fiber to amplify optical signals in the optical domain. However it is important to control of the gain of the EDFA. Most EDFA deployed in most OCS can control the gain of an EDFA using a control loop. However these systems typically only control the average gain of the EDFA. Changes in the input spectrum fed to the amplifier (spectral occupancy and power profile) will affect the per channel gain experienced. As a consequence, typical EDFA control loops cannot compensate for the effects of changing the spectral occupancy (adding or deleting a wavelength channel).

Spectral Hole Burning (SHB) is a known effect that causes fast gain changes to the output of an EDFA due to changes in the spectral occupancy. Undesired dynamic and static perturbations resulting from SHB have in the past been compensated by the photonic layer. However conventional systems use costly equipment to control the gain changes resulting from changes in the spectral occupancy for systems which utilize EDFAs. Furthermore these systems take time to adjust for changes in the spectral occupancy, increasing the amount of time needed to add or delete channels.

There exists a need for an improved OCS which can more quickly adjust the spectral occupancy for an EDFA based OCS.

SUMMARY

Aspects of the disclosure provided systems and methods which reduce the negative effects of SHB when spectral changes are made. Embodiments of the disclosure are directed to methods and systems which preform spectral holes for the range of wavelength channels expected to be used in the OCS. In some embodiments this is achieved by controlling the network to ensure optical power is provided at each of a set of idle tone wavelengths distributed across the spectral band used in the optical communication system.

On aspect of the disclosure provides a method of routing wavelength channels in an optical communication system (OCS). Such a method includes receiving a spectral change request for a connection between a first network element (NE) and a second NE. The method further includes implementing the change request while maintaining optical power at a set of idle tone wavelengths distributed across a spectral band used in the optical communication system. In some embodiments implementing the change request includes assigning traffic to a particular idle tone wavelength for the connection which is dropped at the second NE; and configuring the second NE to provide optical power to the particular idle tone wavelength at egress optical fibers. In some embodiments configuring the second NE includes sending signaling to the second NE. In some embodiments the signaling configures the NE to provide optical power at the particular idle tone wavelength using a local laser. In some embodiments implementing the change request further includes assigning traffic to the particular idle tone wavelength at the add port of the first NE. In some embodiments the minimum spacing between neighboring idle tone wavelengths of the set is no more than a minimum expected spectral hole burning characteristic of an optical amplifier used in the OCS. In some embodiments the optical amplifier comprises an erbium doped fiber amplifier (EDFA). In some embodiments the set of idle tone wavelengths has non-uniform spacing between neighboring members of the set. In some embodiments the spectral band is divided into N regions based on spectral hole widths in a gain profile of the EDFA for wavelength channels within each region, and the separation between idle tone wavelengths is no greater than the spectral hole width for each region. In some embodiments the change request is a request to delete a traffic signal and implementing the change request includes: determining whether the traffic signal is assigned to an idle tone wavelength; disconnecting the traffic signal; and responsive to determining the traffic signal is assigned to an idle tone wavelength, configuring the first NE to maintain optical power at the idle tone wavelength. In some embodiments configuring the first NE to maintain optical power at T the idle tone wavelengths includes instructing the first NE to maintain the laser assigned to the idle tone wavelength in the on state. In some embodiments the method further includes initially determining a set of connections through the network which includes available transponders to provide optical power at the set of idle tone wavelengths. In some embodiments the change request is a request to add traffic; and further comprising performing distributed load balancing to assign the traffic to a wavelength channel. In some embodiments the method further includes responsive to the distributed load balancing assigning the traffic to the wavelength channel at the first NE, configuring the first NE to drop the wavelength channel at the ingress port of the NE and adding the traffic to the wavelength channel at the egress port of the NE. In some embodiments the change request is a request to add traffic to a connection between the first NE and the second NE; in which case the method further includes determining an existing connection between the first NE and the second NE includes an idle tone wavelength which is provided optical power but does not carry traffic; and assigning the traffic to the connection using the idle tone wavelength. In some embodiments the change request is a request to add traffic to a connection between the first NE and the second NE; in which case the method further includes determining an existing connection between the first NE and a third NE through the second NE includes an idle tone wavelength which is provided power but does not carry traffic and determining the $2^{nd}$ NE is equipped with a configurable idle tone power source capable of providing power at the idle tone wavelength at an egress port linking the $2^{nd}$ NE to the third NE. In which case the method further includes assigning the traffic to the connection between the first NE and the second NE using the idle tone wavelength; and sending instructions to the second NE to provide power at the idle tone wavelength at the egress port.

In another aspect there is provided a method of routing wavelength channels in an optical communication system (OCS). Such a method includes assigning a set of lasers in the network to supply optical power at a set of idle tone wavelengths distributed across a spectral band used in the optical communication system. The method further includes reserving the set of idle tone wavelengths as wavelengths not available to carry traffic; and configuring Reconfigurable Optical Add/Drop Multiplexers (ROADMs) to broadcast signals at idle tone wavelengths in order to maintain optical power at the set of idle tone wavelengths throughout the optical communication system. In some embodiments configuring each ROADM further includes configuring an edge node ROADM in a loopback mode such that powered idle tones received on a first optical fiber from a first direction are routed in a second optical fiber in the opposite direction. In some embodiments configuring each ROADM further includes configuring any ROADM which receives the same idle tone from more than one direction to apply filtering such that the same idle tone is not duplicated on any output optical fiber. In some embodiments the set of idle tone wavelengths includes a pair of half tone wavelengths for each member of the set such that there is a first half tone wavelength for a first direction and a second half tone wavelength for a second direction. In some embodiments assigning includes assigning a first set of lasers to produce optical power at the first half tone wavelengths and a second set of lasers to produce optical power at the second set of half tone wavelengths. In some embodiments the first set of lasers is located at a first location and the second set of lasers is located at a second location. In some embodiments the first set of lasers is co-located with the second set of lasers. In some embodiments each set of lasers can be distributed across multiple locations.

Another aspect of the disclosure provides a network controller for an optical communication system (OCS). Such a network controller includes a processor and machine readable memory storing instructions which when executed by the processor implements a routing and spectrum assignment (RSA) function. In such system the RSA function is configured to receive a spectral change request for a connection between a first network element (NE) and a second NE. The RSA is also configured to implement the change request while maintaining optical power at a set of idle tone wavelengths distributed across a spectral band used in the optical communication system. In some embodiments the minimum spacing between neighboring idle tone wavelengths of the set is no more than the minimum expected spectral hole burning characteristics of erbium doped fiber amplifiers used in the OCS. In some embodiments the RSA is configured to assign traffic to a particular idle tone wavelength for the connection which is dropped at the second NE and configures the second NE to provide power to the particular idle tone wavelength at egress optical fibers.

Another aspect of the disclosure provides a network controller for an optical communication system (OCS). Such a network controller includes a processor and machine readable memory storing instructions which when executed by the processor implements a routing and spectrum assignment (RSA) function. Such an RSA function is configured to assign a set of lasers in the network to supply optical power at a set of idle tone wavelengths distributed across a spectral band used in the optical communication system. The RSA is also configured to reserve the set of idle tone wavelengths as wavelengths not available to carry traffic. The RSA configures Reconfigurable Optical Add/Drop Multiplexers (ROADMs) to broadcast idle tone wavelengths in order to maintain optical power at the set of idle tone wavelengths throughout the optical communication system. In some embodiments the minimum spacing between neighboring idle tone wavelengths of the set is no more than the minimum expected spectral hole burning characteristics of erbium doped fiber amplifiers used in the OCS. In some embodiments the RSA is further configured such that configuring each ROADM further includes configuring any ROADM which receives the same idle tone from more than one direction to apply filtering such that the same idle tone is not duplicated on any output optical fiber.

The foregoing and other objects, features, aspects and advantages of the present invention will become more apparent from the following detailed description, taken in conjunction with the accompanying drawings which description is by way of example only.

BRIEF DESCRIPTION OF DRAWINGS

For a more complete understanding of this disclosure, reference is now made to the following brief description, taken in connection with the accompanying drawings and detailed description, wherein like reference numerals represent like parts.

FIG. 2A illustrates the addition of 14 idle tones for a scenario when no other channels are present; FIG. 2B illustrates the addition of two channel signals which occupy the wavelength channels of 2 idle tones; and FIG. 2C illustrates both the addition and deletion of a channel.

DESCRIPTION OF EMBODIMENTS

This section provides detailed descriptions of example embodiments of the present invention. However, any specific details described herein with respect to the system structure or system method are merely representative for purposes of describing example embodiments of the present invention. The present invention may be embodied in many alternative forms and should not be construed as limited to example embodiments of the present invention set forth herein.

An optical communication system (OCS) typically utilizes one or more Erbium Doped Fiber Amplifiers (EDFAs) in each section (fiber link between network elements) of the network. Typically each network element includes an EDFA and a wavelength selective switch (WSS). An EDFA is capable of optically amplifying signals within the typical "C-band" spectral band (1530 nm-1560 nm) utilized by most DWDM OCSs. Most EDFA deployed in most OCS can control the gain of an EDFA using a control loop. However these systems can only control the average gain of the EDFA. Changes in the input spectrum fed to the amplifier (spectral occupancy and power profile) will affect the per channel gain experienced, hence, gain excursion for existing traffic. EDFA control loops typically only control the average gain and cannot compensate for the effects of changing the spectral occupancy. Changing the spectral occupancy, also referred to as a spectral change, includes adding (turn up) or deleting (tear down) a wavelength channel. While the correct node gain can be maintained adjusting the Wavelength Selective Switch (WSS), this will be possible only when the gain variations of the EDFA are much slower than the WSS response.

Spectral Hole Burning (SHB) is a known effect that causes fast gain changes to the output of an EDFA due to changes in the spectral occupancy. When the spectral occupancy of the section changes (due to the addition or deletion of a wavelength channel), SHB causes unwanted changes in gain to neighboring wavelength channels. SHB is caused by different inversions of the erbium ions, which have complex but similar emission and absorption spectra that are shifted in wavelength with respect to each other. Accordingly when one channel is added (or deleted) there is an effect on other, neighboring channels. As a result, the presence of a signal at a given wavelength induces a local gain variation (spectral hole) around the signal that is typically between 2 and 8 nm width.

Figure 1:
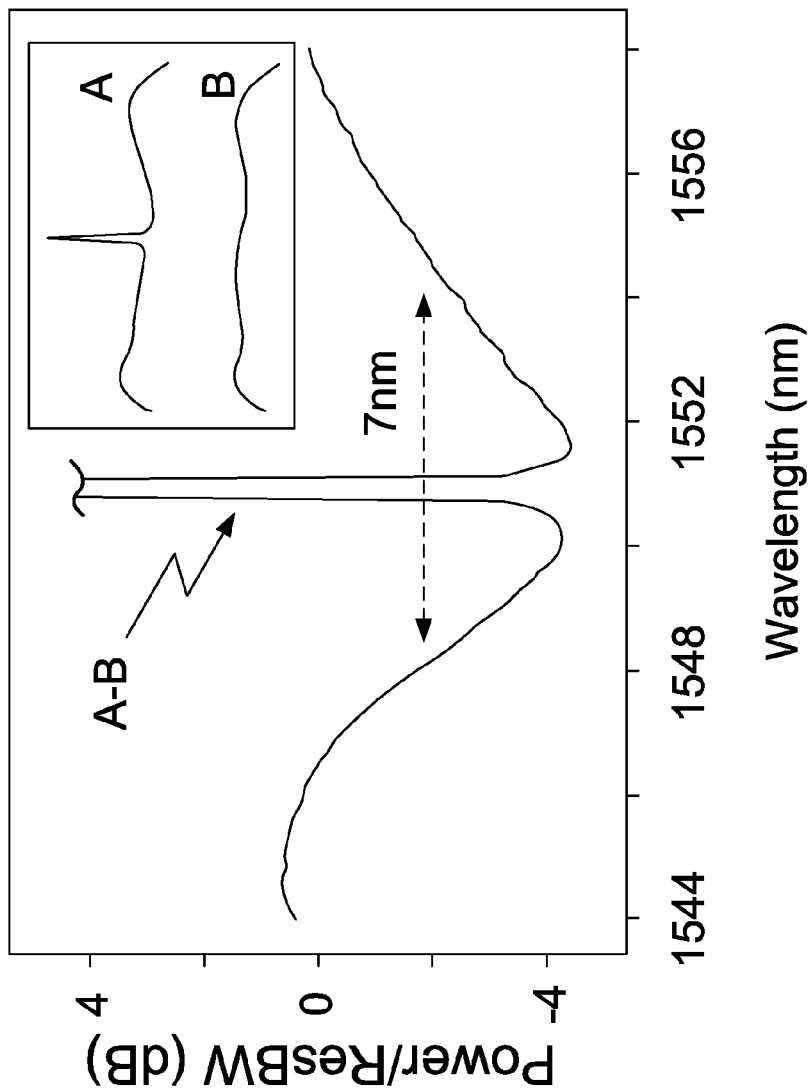
FIG. 1 illustrates spectral hole burning.

FIG. 1 is a graph that shows one example of SHB formation for spectrum profiles A and B, wherein the hole width is estimated by spectral subtraction of A-B. The profile for spectrum B has no active channels, whereas the profile for spectrum A has a single active wavelength channel. Subtraction of these two spectrum (A-B) is shown in FIG. 1, which illustrates the width and depth of the hole for that particular traffic wavelength. In the graph, for this particular example the spectral hole is estimated as 7 nm. It is noted that the width and depth of the hole varies with wavelength. For example considering the wavelength range for the ITU C-band of 1530 nm to 1560 nm; the width of the hole can vary from around 2 nm at the lower end of the spectral band to approximately 8 nm for wavelengths at the upper end. An observation noted by the inventors herein is the fact that local gain variations for the EDFA are caused by the burning or forming of the spectral hole and that significant additional spectral hole burning effects do not typically occur within an already formed spectral hole. Further an existing spectral hole is not considerably enlarged by a spectral change within the hole. Accordingly, any channel that is subsequently added or deleted within an existing hole (the 7 nm range illustrated in FIG. 1) will have a much smaller affect on the gain of the EDFA.

Accordingly, one aspect of the invention is to provide systems and methods which avoid the negative effects of SHB when spectral changes are made. Embodiments of the disclosure are directed to methods and systems which preform spectral holes for the range of wavelength channels expected to be used in the OCS. Embodiments include a configurable idle tone source for providing optical power to each of a set of idle tone wavelengths distributed across the spectral band used in the optical communication system. The configurable idle tone source is communicatively coupled to an output fiber of an optical network element and controlled such that optical power is present in the output optical fiber at each one of the set of idle tone wavelengths. While the term "optical power at idle tone wavelength(s)" is used in this specification, it should be appreciated that equivalent terms "idle tone wavelength channels", "idle tone channels", "idle tones", "idlers" or "dummy channels" may also be used for brevity.

The number of idle tone wavelength channels utilized by the system can vary as tradeoff between complexity and a desire to maximize spectral efficiency. As stated, the spacing between spectral holes varies with wavelength. Accordingly, the minimum spacing between neighboring idle tone wavelength channels of the set should be no more than the minimum expected spectral hole burning characteristics of the erbium doped fiber amplifiers traversed by the set. Embodiments will first be discussed for a specific example, which assumes a uniform spacing for simplicity. Generalizations will then be discussed. It should be appreciated that technically speaking the wavelength grid for ITU channel spacing is not uniform in terms of wavelength units (although it is typically uniform in frequency units, e.g. 50 GHz spacing, 100 GHz spacing, etc.). Accordingly the term uniform spacing should not be strictly construed to require a fixed number of wavelength units. Rather the term uniform spacing in this specification refers to a simplification which refers to spacing in terms of a number of channels, assuming a fixed channel grid in terms of frequency units. The term non-uniform spacing refers to the fact that the spacing between spectral holes varies with wavelength, and there for the spacing between idle tone wavelengths can be larger for larger wavelengths.

Embodiments will be discussed using examples for a typical 80 channel DWDM with 50 GHz spacing for the C band, but it should be appreciated that the systems and methods discussed herein can be extended to other OCSs, for example Coarse or Ultra dense DWM systems which may utilize the C band or extended spectral bands (e.g., the "L-band"), or for flex grid systems. In some embodiments the idle tone wavelength channels are distributed across the spectral band and may be treated as photonic control channels similar to wavelength division multiplexing (WDM) channels. The power of the channel is typically 3-4 dBm but it may be higher or lower depending on circumstances.

Figure 2A:
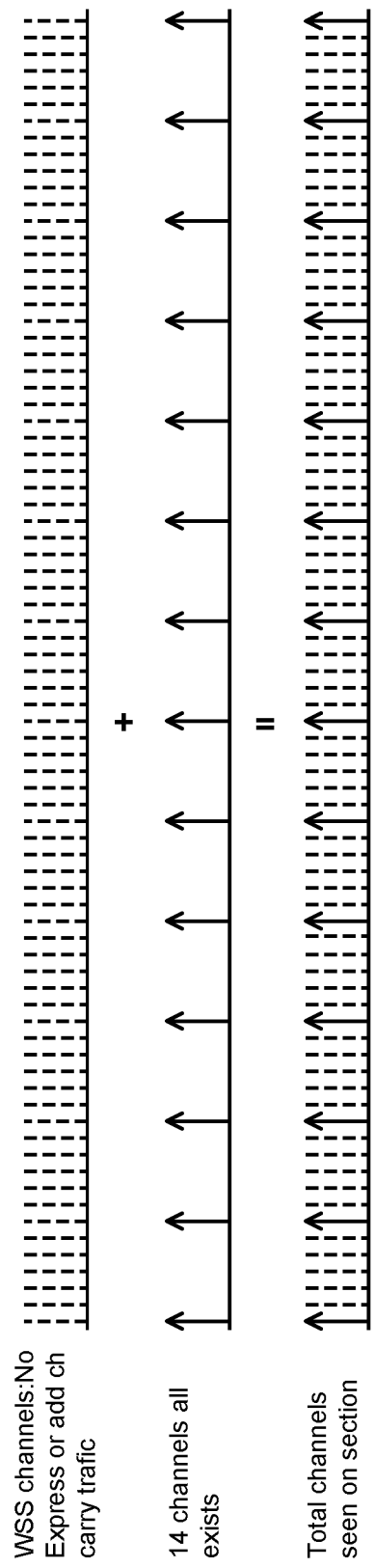
FIGS. 2A, 2B, and 2C schematically illustrate three scenarios for implementing idle tones.
Figure 2B:
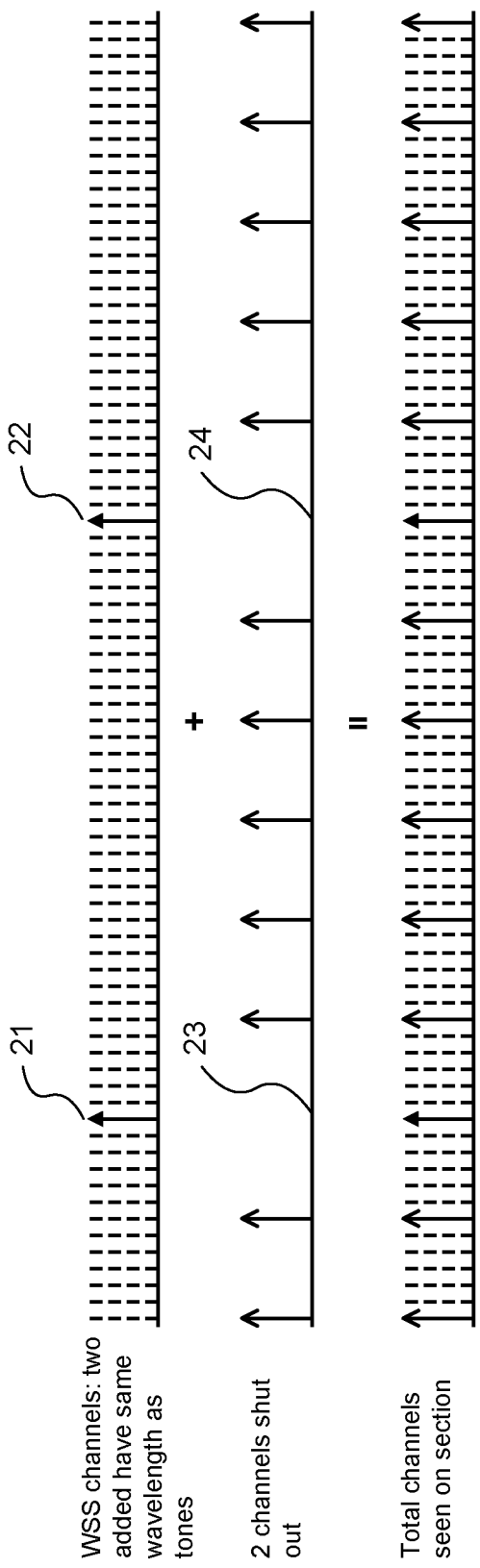
Figure 2C:
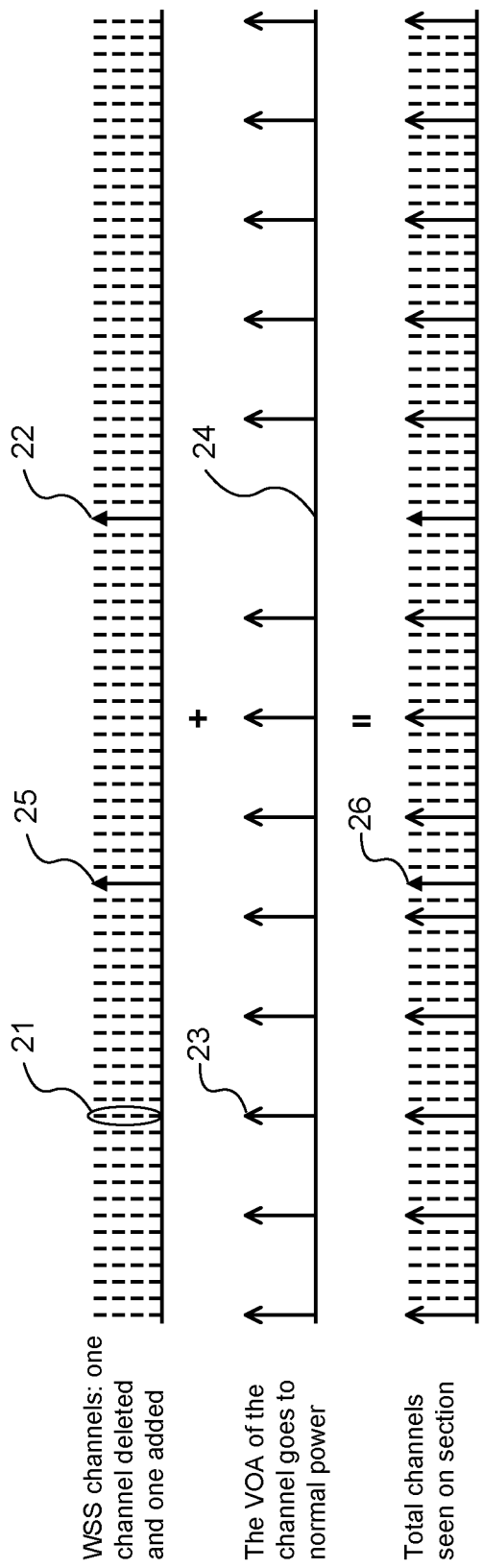

FIGS. 2A, 2B, and 2C schematically illustrate the presence of wavelength channels distributed across a spectral band at an egress output fiber of an optical network element according to an embodiment. In this example, the spectral band corresponds to the ITU C-Band allocation for DWDM which utilizes 80 wavelength channels of 50 GHz width, but it should be appreciated that 72, 88, 96 or other allocations of wavelength channels could be used. In each figure, there are three graphs which delineate, from the top to the bottom, the presence of WSS channel signals, idle tone signals, and total channel signals in the section respectively. In each graph, an arrow represents that there is power at the wavelength where the arrow is placed, whereas dashed lines represent unlit wavelength channels.

FIG. 2A represents wavelength channels across a spectral band when the WSS of the optical network element receives no express channel signal wavelengths carrying data and no channel signal wavelengths are added at the add port of the network element. The top graph of FIG. 2A indicates an absence of express or added channels that carry traffic across the spectral band. A set of idle tone wavelength channels are distributed across the spectrum of channels as shown in the middle graph. In the embodiment shown, the set of idle tone wavelength channels consists of 14 idle tone signal wavelength channels distributed across the spectral band. This set is selected such that the spacing between idle tone wavelength channels is no more than more than the minimum expected spectral hole width. As the minimum hole width discussed above is 2 nm, selecting 2 nm spacing allows for a uniform spacing between any two neighboring idle tone wavelength channels of the set, while ensuring all spectral holes are pre-formed. Accordingly, based on the ITU channel spacing discussed above, this allows for a uniform spacing of 5 traffic wavelength channels between any two neighboring idle tone wavelength channels of the set. The bottom graph represents the total channels that are transferred to an optical fiber which results from the combining of the top and the middle graphs in the figure. In the present example shown in FIG. 2A, only the 14 idle tone wavelength channels have power as there are no traffic channels present. In other words, when there are no traffic signals, then the sources for all 14 idle tone wavelength channels are powered on. Note that in some embodiments all wavelength channels are available for traffic signals. In the event of 100% channel usage (i.e., all wavelength channels carry traffic) then no power is provided to the idle tone wavelength channels.

FIG. 2B represents the presence of channel signals across a spectral band when there are two added wavelength channels 21, 22 carrying data/traffic received at the WSS. The middle graph illustrates the sources for the two corresponding idle tone wavelength channels 23, 24 are shut off because the two added wavelength channels 21, 22 are now carrying data/traffic. The total channels illustrated in the bottom graph of the figure are the same as in FIG. 2A, as there is power on the same 14 wavelength channels. The 14 wavelength channels which have power comprise the 2 traffic wavelength channels carrying data and the remaining 12 idle tone wavelength channels. Accordingly the bottom graph of FIG. 2B illustrates no more than 2 nm spacing between wavelength channels which are provided power across the entire spectral band, ensuring that spectral holes exist across the entire band. Consequently additional channels can be added (i.e., channel turn up) without creating SHB effects for the EDFAs in the section.

FIG. 2C provides graphs for another example scenario that is a continuation of FIG. 2B. The top graph in FIG. 2C represents that one of the two existing traffic channel signals 21 in FIG. 2B is deleted and another traffic channel signal 25 is added on the spectral band. The traffic channel signal 25 which is added does not occupy one of the idle tone wavelength channel, but occupies a wavelength channel between two idle wavelength channels. As illustrated in the middle graph of the figure, the idle tone wavelength channel 23, which was shut off due to the emergence of the traffic signal 21 in FIG. 2B is now turned on as the traffic signal wavelength 21 is now deleted. This ensures that there is power of every wavelength channel in the set of idle tone wavelength channels. However, idle tone 24 will remain shut off as there is still traffic channel signal carrying data 22 on the same wavelength, and accordingly there is still power at that wavelength channel. No change to the idle tones in the middle graph is required due to addition of traffic channel 25 as it does not correspond to one of the idle tone wavelength channels. The bottom graph illustrate the total channels provided with power in the section after coupling the WSS traffic channel signals and the idle tone signals generated by a configurable idle tone source, which could be, for example, a set of laser diodes, optionally operating at a same constant output power. As shown in the graph, there are now a total of 15 wavelengths provided with optical power comprising the 14 idle tone wavelength channels and the added traffic signal 26, which does not occupy one of idle tone wavelength channels.

In the above discussion, it is assumed that the separation between idle wavelength channels should be no more than 2 nm to ensure that no further SHB effects will occur, based on the minimum measured SH width being 2 nm. This minimum spacing can be selected for systems which prioritize system simplicity over spectral efficiency, as it allows for uniform spacing between the idle tone wavelength channels throughout the spectral band. However, even when uniform spacing is considered, the set may be varied from that shown. For example, the position of idle tone wavelength channels could be shifted by half of the minimum width of hole, (e.g., two or three wavelengths for 2 nm). Further the number of idle tone wavelengths (I) in the set can be varied based on the number of channels utilized in the system. For example, if 88 channels are used, than a set of 15 idle tone wavelengths can be used to ensure all spectral holes are pre-formed (i.e., to avoid significant further SHB effects).

However, as mentioned above, as the widths of the spectral holes vary with wavelength, the minimum spacing between idle tones need not be uniform. The spacing can be varied with wavelength and still result in preventing additional SHB effects. Accordingly a larger spacing between idle tone wavelength channels can be used for wavelengths which produce wider spectral holes. This can allow for a system which utilizes a smaller set of idle tone wavelength channels than would be required if uniform spacing is used. In some embodiments, the system can increase the spacing between consecutive idle tone wavelengths as soon as the expected spectral hole width has increased by a number greater than the size of the separation between consecutive channel wavelengths (which will typically be a fixed number unless a flexible grid is used). Some embodiments can tradeoff complexity with spectral efficiency by dividing the spectral band into N regions or sub-bands and for each region determining a spacing based on the a minimum hole width within that region. Such a system can have N local minimums depending on the number of regions.

Figure 3:
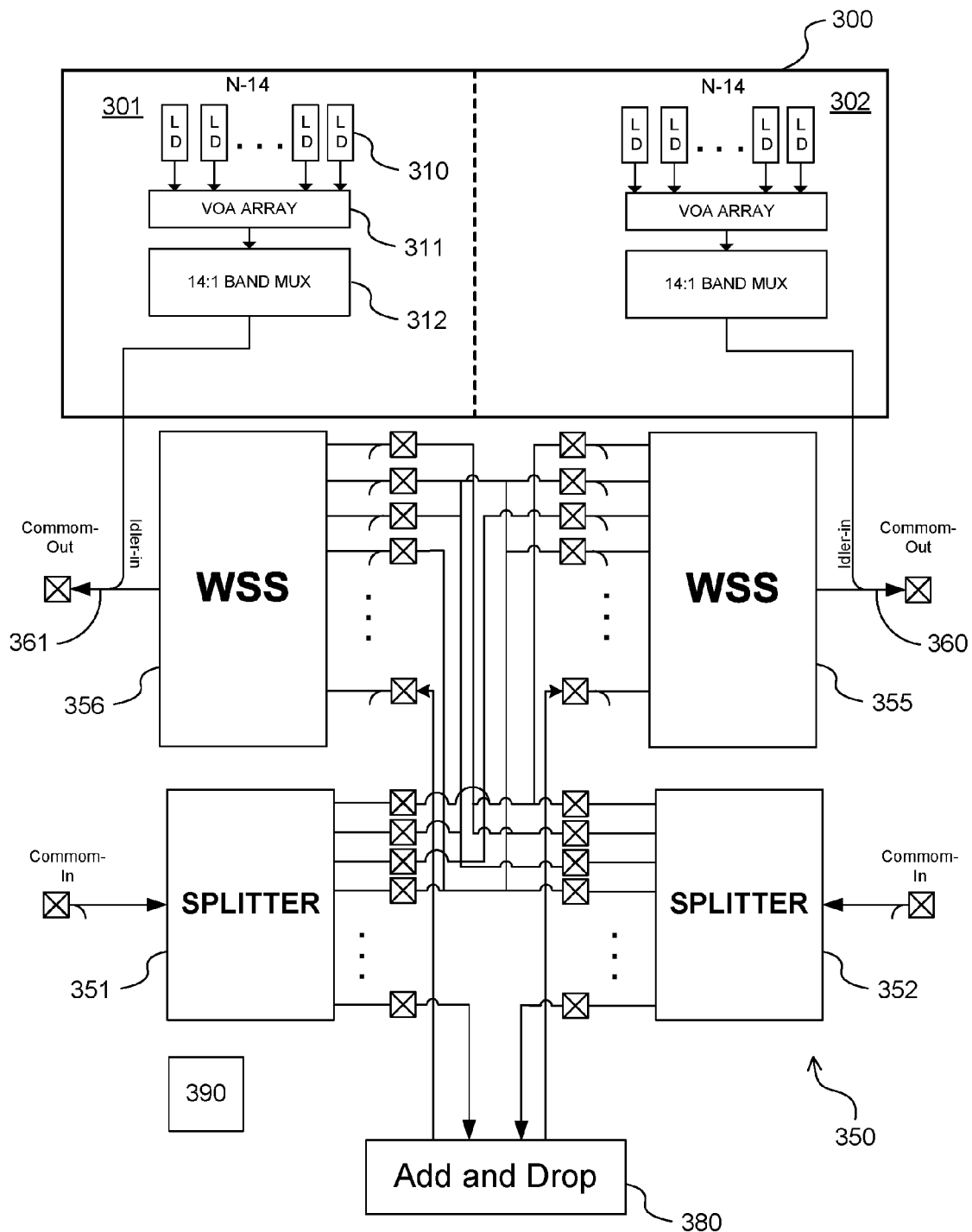
FIG. 3 schematically illustrates an add/drop multiplexer according to an embodiment.

FIG. 3 is a block diagram of a network element (NE) such as an add/drop multiplexer, according to an embodiment. The NE includes various components including a configurable idle tone source 300, a signal add/drop module 380, output fibers 360, 361 and a passthru section which in this example includes WSSs 355,356 and splitters 351,352, and the interconnections between them. It should be noted that to simplify the figure, not all of the interconnections are shown, some embodiments would include a large number of interconnections, as each splitter would send a copy of each wavelength to the respective WSS and the add/drop module 380. The NE can be a Re-configurable optical add/drop multiplexer (ROADM).

A signal will be received by one of the multiple splitters 351, 352 depending on the direction from which the signal originates. The splitters may be replaced by an alternative form of de-multiplexers that perform similar operations, such as another WSS. The DWDM signal received by a splitter will be separated into a plurality of traffic channel signal wavelengths. A copy of the traffic channel signal wavelengths will be directed to the add/drop module 380 which will drop the traffic channels allocated (by the RSA) as drop channels. Another copy of the traffic channels will be passed to one of the WSS 355, 356, depending on the direction of the destination of the traffic channel signal wavelengths. In addition, one or more new wavelength channels may be added by the add/drop module 380 and passed to one of the WSS 355, 356, again depending on the direction of the destination of the added wavelength channels.

As a result, a plurality of traffic wavelength channels will be received by WSS. Before being transmitted to an output optical fiber 360, 361, the traffic wavelength channels will be coupled with up to 14 idle tone wavelength channels provided by the configurable idle tone source 300. Using the idle tone wavelength channels, the effect of spectral hole burning will be minimized by ensuring that spectral holes are already present as described earlier.

The NE in the present example includes a configurable idle tone source 300, comprising a source module 301, 302 for each output optical fiber 361, 360 respectively. Source module 301 comprises 14 laser diodes 310, an array of variable optical attenuators (VOA) 311, and a mux 312. Each of the 14 laser diodes 310 generates optical power at one of the idle tone wavelength channels. In some embodiments the lasers used to provide optical power at idle tone wavelengths, are unmodulated lasers providing constant optical power, which in some embodiments, are not varied to adjust the spectral flatness of EDFA. The VOA 311 can attenuate the power for idle tone wavelength channels which are not needed (as they are already present at the output fiber). It should be appreciated the VOA acts like a switch to effectively switch the state of the lasers to on/off. For this purpose, the VOA need not partially attenuate the power. In this specification the term adding optical power refers to effectively switching on the power of the source, which is equivalent to having all of the sources on and (completely) attenuating the sources which are not needed. Accordingly, a set of switches can be used as an alternative. Source module 302 has a similar configuration. It should be appreciated that source module 301, 302 does not need to vary the amount of optical power provided. In some embodiments each source module can be implemented in a single chip. It should be appreciated that FIG. 3 illustrates a 2 degree ROADM, and the principles discussed herein can be extended for ROADMs with additional degrees. ROADMs with additional degrees would include additional source modules.

Which idle tone wavelengths that should be attenuated by the VOA can be decided by a network element Shelf Controller (SC) 390. The SC 390 may receive the instruction from Domain Optical Controller or any other controller, such as Transport SDN or an optical burst switch controller or a path computation element. For example, each WSS receives all the wavelengths from all other inputs (remembering that ROADMs can have more than 2 degrees). The node controller 390 includes a connectivity table which updated from the domain controller (or other controller as stated above). The node controller 390 determines which wavelengths are filtered by WSS to appear at the output fiber(s). If the outcome of this filter operation does not include power to any of the set of idle tone wavelength channels, the node controller 390 will instruct the source module to turn the sources for the missing tones on for combining with the output fiber.

Which subset of idle channel signal wavelengths will be turned on will depend on whether there is traffic channel signals present on any of the idle tone wavelength channels as described above. The decision made by the SC 390 will be transmitted to the VOA 311 to control the power level of each laser signal. In other words, the VOA array 311 determines whether each idle tone wavelength channel generated by the corresponding laser will be used and coupled into the output optic fiber path. Alternatively, a set of advanced laser diodes or alternative idle tone generators may be used so that they can determine their ON/OFF mode by themselves and additional devices such as the VOA 311 will not be required.

After selected idle tone wavelength channels are provided by the idle tone source 301, the idle tones will be coupled to the optical fiber 361 with the traffic signal wavelength channels from WSS 356. The coupled wavelength channels carried by the optical fiber 361 is the total wavelength channels illustrated in the bottom graphs of FIG. 2A, FIG. 2B and FIG. 2C. It should be appreciated that the idle tone source 302 performs a similar function to provide idle tones for optical fiber 360.

FIG. 3 illustrates one example of a network element which utilizes a configurable idle tone source capable of producing idle tone signals for every element of the set of idle tone wavelength channels distributed across the spectral band. In this example, the set includes 14 idle tones, so 14 laser diodes are included. The controller 390 controls the configurable idle tone source 301 to add optical power at each idle tone wavelength which is not otherwise present at the output fiber 361. Each idle tone wavelength channel is not otherwise present at the output fiber if it is present at the input fiber and is dropped but not added by the add/drop module. Further, an idle tone wavelength channel is not otherwise present at the output fiber if it is not present at the input fiber. If either of these conditions is true for an idle tone, than the controller turns on the source, or alternatively, ceases to attenuate a source for the idle tone.

In some embodiments the add/drop module 380 includes tunable transponders which can produce wavelength channels modulated with data signals. In the absence of data traffic, the laser source of transponder can be used to produce power at idle tone wavelengths which is not otherwise present at the output fiber. It should be appreciated that in this context, the add drop module is considered to include transponders and the controller 390 can control the state of the transponders. In some embodiments, the tunable transponders of the add/drop module can produce optical power at all 14 idle tone wavelengths, in which case the configurable idle tone source can be considered to include these transponders. As an option, the idle tone source may provide a constant unmodulated optical power at all idle tone wavelengths. In some embodiments, the optical power levels are the same and not adjusted, other than being turned on and off. In other embodiments, the optical power levels at all idle tone wavelengths are the same except for one idle tone wavelength, at which a small amplitude modulation, e.g. no greater than 10%, is provided for diagnostic and/or metrological purposes.

In some embodiments the configurable idle tone source includes a number of sources configured to produce a subset of the set of the idle tone wavelength channels, and the tunable transponders are configured to produce the remainder of the set of the idle tone wavelength channels. This may be advantageous in situations where the add/drop module does not include sufficient transponders to power all of the idle tones and/or the source modules 301/302 do not include sufficient transponders to power all of the idle tones.

Figure 4:
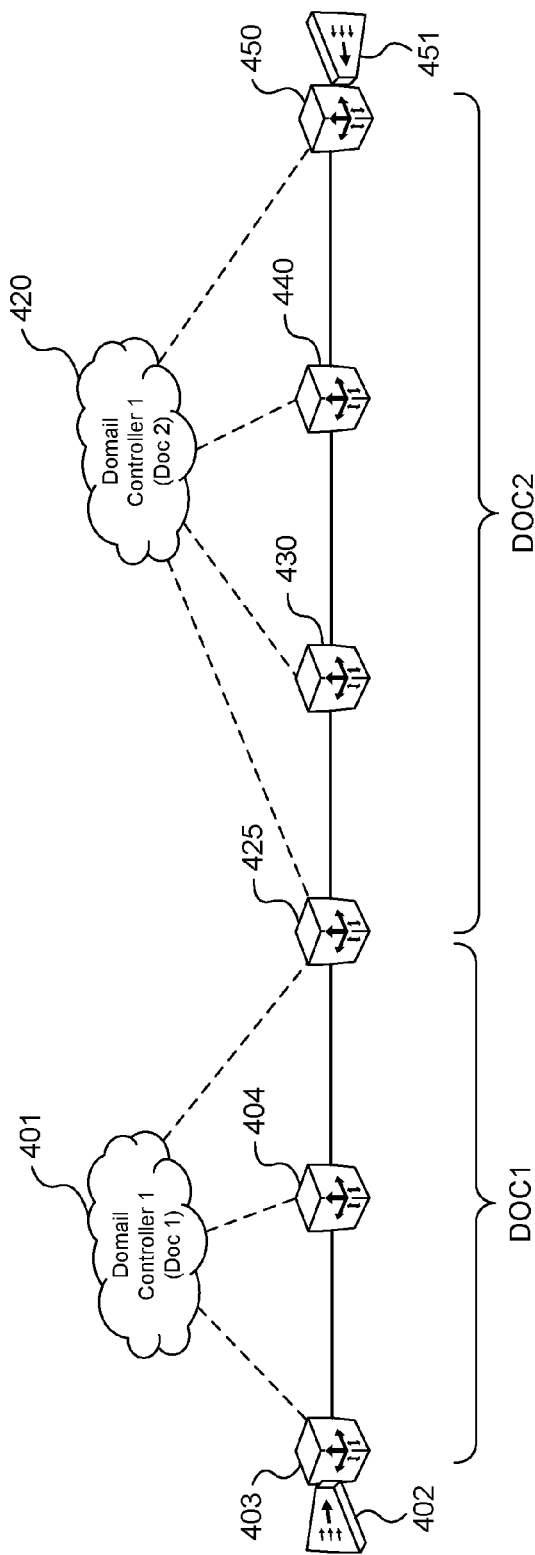
FIG. 4 schematically illustrates an OCS having two domains according to an embodiment.

FIG. 4 schematically illustrates a portion of an OCS which utilizes a plurality of network elements, according to an embodiment. Such an OCS includes a plurality of network elements (e.g., ROADMs) 403, 404, 425, 430, 440 and 450 interconnected by sections. The connection between each network element is referred to as a section, and includes optical fiber and some number of EDFAs, depending on the distance between the network elements. The network elements are grouped into domains, with each domain controlled by a domain controller (DOC). FIG. 4 illustrates a first domain controller 401 for DOC1 and a second domain controller 420 for DOC2. DOC1 includes network elements 403 and network element 404. Network element 403 includes connections 402 to another portion of the OCS, or to another OCS. Network element 425 is at a boundary between DOC1 and DOC2, and thus includes signaling connections to both DOC1 401 and to DOC2 420. DOC2 is considered to include the section linking NEs 425 and 430. DOC2 also includes network element 430 and network element 440. Network element 450 includes connections 451 to another portion of the OCS, or to another OCS. It should be appreciated that each network element includes controller 390 (as shown in FIG. 3), which controls the operation of the network element, and thus the output from the network element into each section. Each network controller 390 receives control signaling from its corresponding domain controller. In some embodiments, the domain controller effectively controls the network element controller via signaling. Thus, the shelf controller (SC) in each Network Element (NE) can receive instructions from Domain Optical Controller or any other controller, such as Transport SDN. In some embodiments, the DOC can decide what subset of idle tone wavelength channels should be generated by each SC based on its decisions as to which traffic channels pass-through or are added or dropped by each NE.

It is noted that in some embodiments, in order to avoid the cost and complexity of having all of the idle tones be locally produced at every network element, a network element may be equipped with fewer than the number of lasers necessary to provide power to every idle tone. In practice such embodiments could be used in some situations provided the express traffic includes power on the idle tones that cannot be provided locally. The DOC would need to ensure that each section includes power on each idle tone wavelength channel, and ensure traffic is not dropped at a node which does not have a transponder (available) for any given idle tone wavelength channel. This would represent a trade-off between cost and reliability. However, such an embodiment would have limited ability to recover from a fault, as discussed below with reference to FIG. 5.

Figure 5:
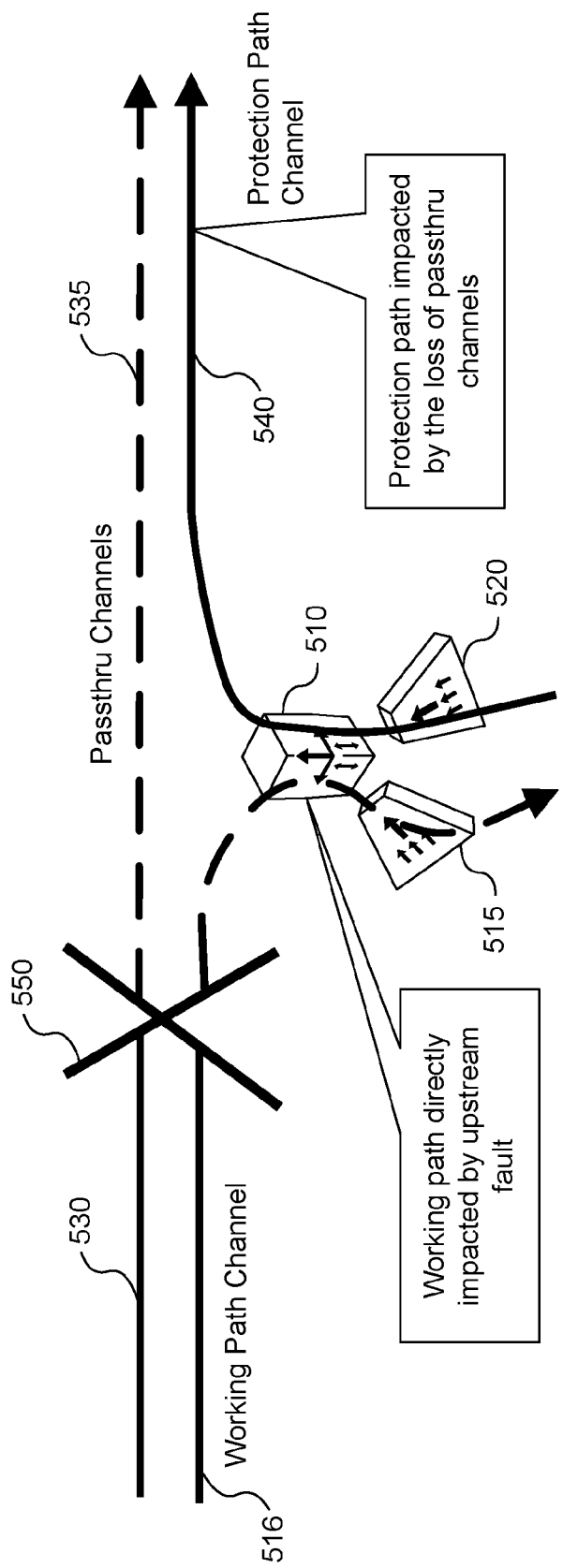
FIG. 5 schematically illustrates a potential use case for an embodiment in the presence of a fault.

FIG. 5 is a block diagram of an example application for using embodiments discussed above. Embodiments can be used during protection switching when one or more channel signal wavelengths are lost due to unexpected outages such as an optical fiber cut. When one or more signal channel losses are detected at the input fiber of a network element, embodiments can turn on the lasers that are off (or attenuated) to eliminate the SHB impact of losing traffic channels at the idle tone wavelength channels for passthru traffic. FIG. 5 illustrates a network element 510 which drops channels 516 at drop port 515 and adds channels 540 at add port 520. Working channels 530 would normally traverse the network element 510 as passthru (express) channels 535. In the event of a fault at 550, the working channels (both drop channels 516 and passthru channels 530) would no longer be present at the input fiber of the node 510. Accordingly, the node would turn on the lasers for each of the idle tone wavelength channels which are not added at the add port 520 to ensure all of the idle tone wavelength channels are provided power at the output fiber.

Some embodiments can be well suited to an OCS which utilizes optical burst switching (OBS) over DWDM. OBS is an application for a using of wavelength for a short period of time (the duration of the transmission burst). Traditionally optical connections are long (e.g., set up for durations of hours, days, etc.). Conventional systems took time to turn up channels (or otherwise change the spectral occupancy) to adjust network parameters to compensate for SHB effects introduced by EDFAs. The lengthy channel turn up time for conventional systems could be tolerated for long duration connections but was one of the impediments which prohibited OBS. However, by ensuring all of the idle tone wavelength channels are provided power, the channel turn up time is reduced, effectively removing one of the impediments to OBS. Accordingly embodiments can enable an OBS system.

The above description sets out methods and systems for using a section based approach for managing spectral occupancy using a configurable idle tone source at each network element. An alternative network based approach will now be discussed. In some embodiments, such an approach could be adopted with existing network elements without requiring additional hardware (or at least not requiring additional hardware at most network elements). Further, embodiments which utilize a hybrid approach will also be discussed. Note that examples for these embodiments will also refer to an 80 channel "C-band" grid, but once again the methods and systems discussed herein can be extended to optical communication systems which use other spectral grid configurations, as well as non-EDFA amplifiers suffering from SHB effect.

Figure 6:
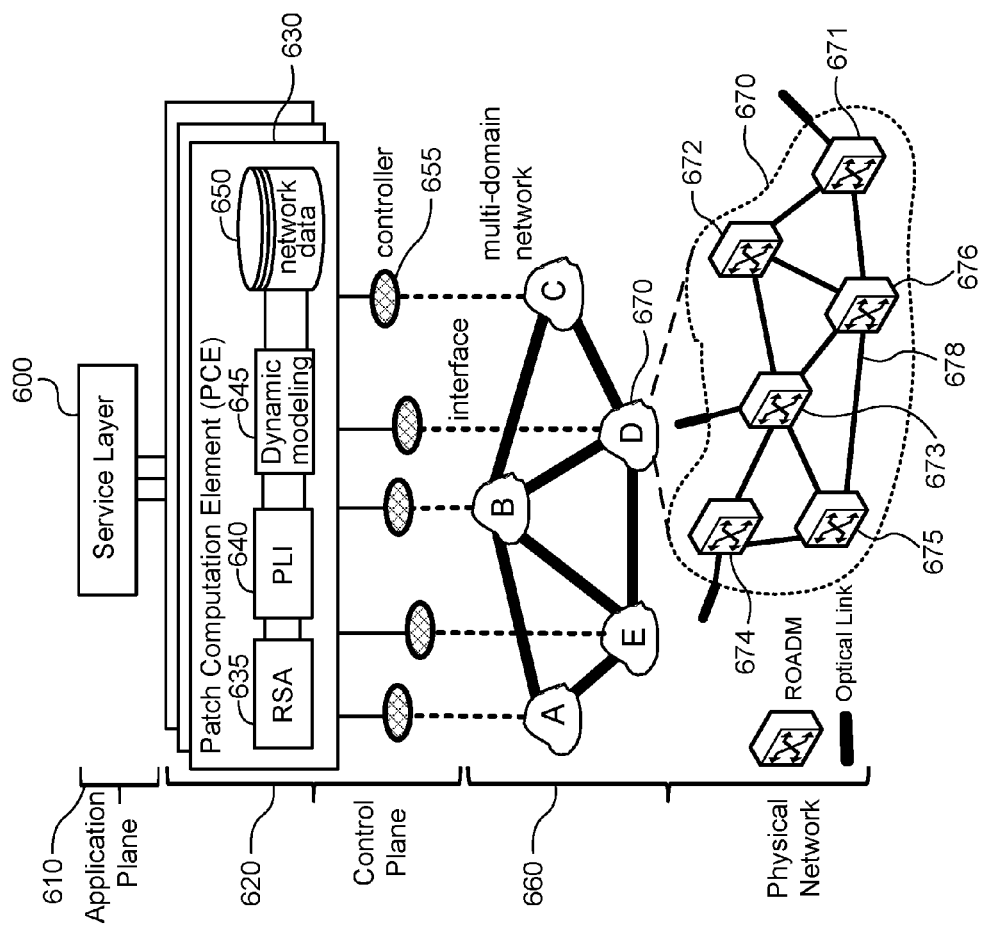
FIG. 6 illustrates a network view of an optical communication system (OCS), according to an embodiment.

FIG. 6 illustrates a network view of an optical communication system (OCS), according to an embodiment. The network can be generally organized in terms of an application plane 610, a control plane 620 and the physical network elements 660. A service layer 600 in the application plane 610 implements various services which are provided over the OCS. In some embodiments, the service layer 600 can implement optical burst switching using the systems and methods discussed herein. A path computation element (PCE) 630 determines how the physical network elements can be used to provide services. The PCE 630 includes a Routing and Spectrum Allocation (RSA) module 635. RSA is also sometimes referred to as a Routing and Wavelength Assignment (RWA). The RSA module 635 assigns spectrum to satisfy a service request by allocating traffic to wavelength channels. The wavelength channels are routed between network elements (NEs), which are also called nodes, so that traffic can be routed from a source to a destination node. The RSA utilizes a database of network data 650, along with a physical layer impairments (PLI) module 640, and a dynamic modeling module 645 to determine how to best route the signals. The PLI module 640 considers linear and non-linear impairments, and the dynamic modeling module 645 determines photonic layer related timing, can consider such factors as EDFA dynamics, EDFA gain control, provisioning, messaging, etc.).

The physical network 660 can be divided into domains, for example domains A, B, C, D and E. Each domain would include a plurality of network elements (typically ROADMs) interconnected via optical links (sections). An example of domain D 670 shows an example of 6 ROADMs 671-676. The ROADMs are connected by links, for example link 678, each of which can include multiple EDFAs depending on the distance between nodes.

Each domain would have a domain controller, for example DOC 655, which is part of the control plane 620, which sends control plane signals to control each node. It should be noted that there may be a plurality of PCEs. In some embodiments an OCS may include multiple PCEs and multiple DOCs. In some embodiments the controller can be an SDN controller which can include the PCE function. In other embodiments the RSA can be a separate function located between such an SDN controller and the service layer. While the figure illustrates a control entity for each domain, it is not necessary that each domain include its own controller, as in some embodiments a control node can control more than one domain. In some embodiments the PCE function can be a distributed function with multiple PCE components collectively performing the PCE function. However, in some embodiments, each domain may belong to a different service provider, in which case there would be a PCE and DOC for each domain.

Embodiments are directed to a PCE or an SDN controller which implements a method of controlling spectral occupancy to avoid SHB affects when adding or deleting channels. Embodiments will be discussed for the example utilizing uniform spacing between idle tones discussed above with reference to FIG. 2. Such a method assigns traffic to, and routes wavelength channels according the following rules.

a) The maximum space between utilized channels is less than the minimum expected spectral hole width. As stated above, the minimum hole width, and therefore the maximum space between idle tones is wavelength dependent.

b) Wavelength channels are routed such that for each ROADM, the express (passthru) channels plus added channels (at the add port) complies with rule (a).

Utilized wavelength channels comprise traffic channels and idle tones which are not used to carry traffic but are provided power. The PCE/RSA maintains optical power at the set of idle tone wavelengths for each section (or at least each section long enough to require an optical amplifier). The set of idle tones at idle tone wavelengths can be initially provided power by unused transponders in the network. These powered idle tones at the idle tone wavelengths can be routed through the network. In brief, the PCE/RSA produces two sets of routes; a set of routes for traffic channels and a set of routes for idle tone wavelength channels necessary to ensure that each idle tone wavelength channel is provided power for each section.

Figure 7:
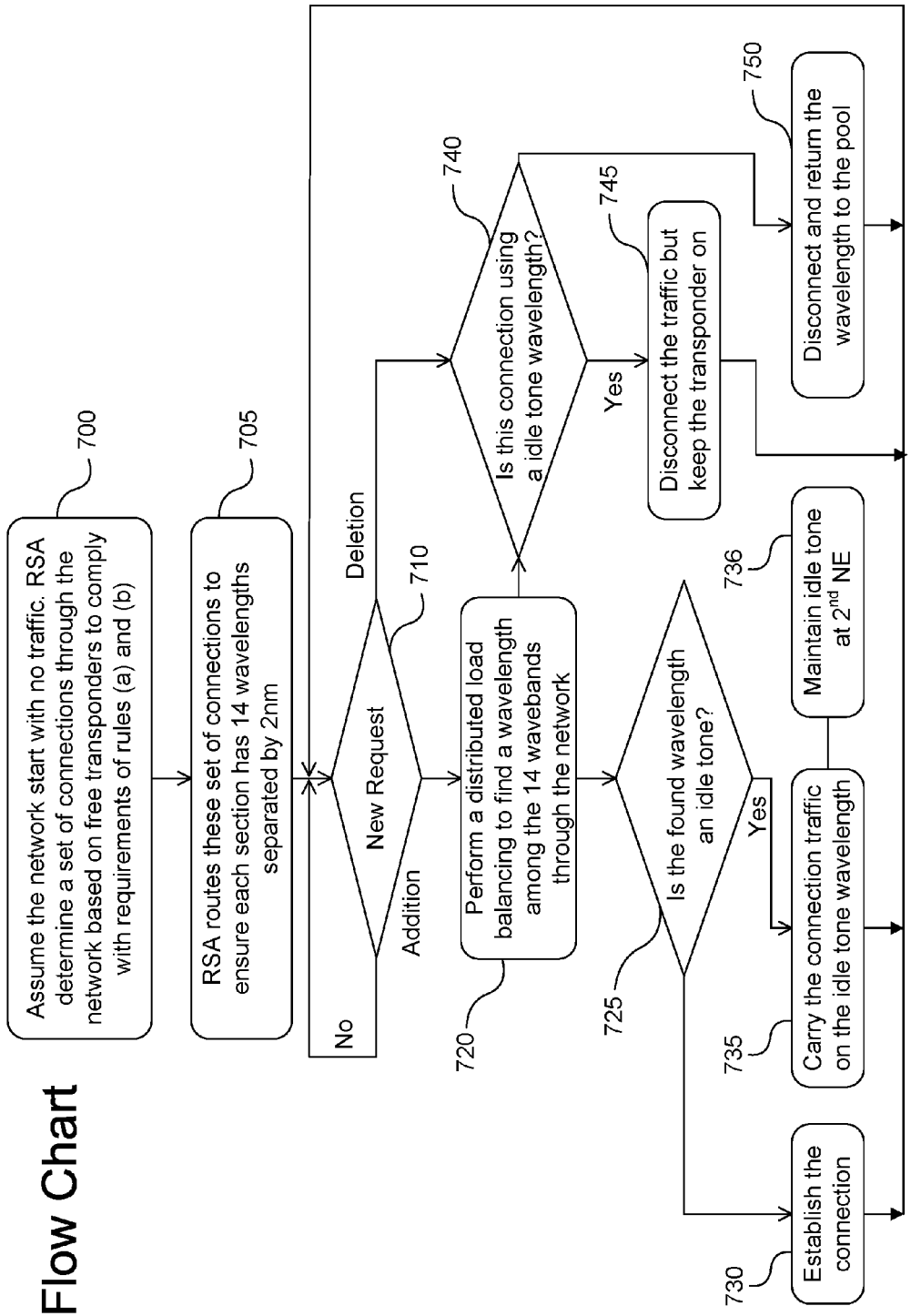
FIG. 7 illustrates a method for implementing a spectral change request executed by the controller of the PCE, according to an embodiment.

FIG. 7 illustrates a method for implementing a spectral change request executed by the controller of the PCE, according to an embodiment. In this example, it is assumed the set of idle tone wavelength channels comprises 14 wavelength channels with a uniform separation of 2 nm. As stated above, this is just an example. For practical considerations, the separation may not be uniform in wavelength units, since ITU grid spacing is not uniform in wavelength units. Other embodiments can consider the fact that the spectral hole width is a function of wavelength. For example, for an 80 wavelength grid, the number of idle tone wavelength channels can be less than 14 as the hole width (and therefore the maximum separation between idle tones) is larger for some parts of spectrum. At step 700 it is assumed that the network starts with no traffic. The RSA module determines a set of connections through the network based on free transponders to comply with the requirements of rules (a) and (b) as set out above. At step 705 the RSA routes these set of connections to ensure each section includes power of the set of idle tone wavelengths (14 wavelengths separated by 2 nm in this example). At network startup, there is initially no traffic, so 14 transponders (somewhere in the network) are tuned to the appropriate idle tone wavelength channels whose signals are then routed through each section. The PCE receives a spectral change request at step 710. This request changes the spectral occupancy of the network by adding traffic to a channel wavelength or deleting traffic from a channel wavelength. It is noted that in conventional optical systems, deleting traffic from a channel wavelength typically involves removing optical power from that wavelength, as the transponder which was supplying the traffic is turned off. Such a change request typically involves a connection from a first NE to a second NE, it being appreciated that there may be multiple intermediated NEs. In the case of a deletion, the PCE determines if the connection to be deleted corresponds to an idle tone wavelength at step 740. If traffic carried on an idle tone wavelength is to be deleted, then the PCE instructs the first NE (the source of the traffic) to disconnect the traffic but keep the transponder on at step 745. If not, the PCE instructs the first NE to disconnect at step 750, and then the PCE returns the wavelength to the pool of available channel wavelengths, for example by updating an internal database of available channel wavelengths.

If the change request is to add a new traffic connection between the first NE and the second NE, then a routing and spectrum assignment process is implemented. At step 720 the PCE selects a wavelength channel from the pool of available wavelength channels to carry the traffic. In the embodiment shown, traffic additions can use a distributed load balancing process among the wavebands defined by the idle tones, with each waveband starting with one idle tone wavelength and including the non-idle tone wavelengths between idle tone wavelengths. For example, as stated the system can utilize non-uniform spacing to accommodate the fact that the hole width is a function of wavelength. In which case, the system can assign a weight for each waveband which is proportional to the hole width. For such an embodiment, the RSA can consider load balancing each waveband based on the weights. The next step depends on whether the selected wavelength is that of idle tone wavelength channel 725. If the selected wavelength is not that of an idle tone, then the PCE instructs the first NE to establish the connection to carry the traffic 730. If the selected wavelength is that of an idle tone, than the PCE instructs the first NE to add the traffic 735. In some embodiments, this can involve using the same transponder whose laser is tuned to the idle tone wavelength. This would then include utilizing the transponder data path and DSP to modulate the signal generated by the laser for the idle tone (i.e., using the transponder which is providing optical power at the idle tone wavelength), or disconnecting that transponder and utilizing another transponder to generate the traffic at the selected idle tone wavelength. Further, as the idle tone wavelength is now being used for traffic between the first NE and the 2$^{nd}$ NE, this implies the idle tone is dropped at the 2$^{nd}$ NE. Accordingly, the PCE at step 736 maintains the idle tone at 2$^{nd}$ NE. In other words, the PCE configures the second NE to provide optical power at the idle tone wavelength at egress optical fiber(s). This can be done by signaling messages using the control plane to configure the NE to provide optical power at the dropped idle tone wavelength using a local laser. Alternatively the PCE can assign add traffic to the dropped idle tone wavelength at the add port of the second NE. It should be appreciated that while the flowchart illustrates the steps for a single change request, in reality the PCE may handle many such requests simultaneously. A constraint on the RSA process (which flows from rules (a) and (b) stated above) is the PCE should not assign traffic to an idle tone wavelength and then drop the traffic at the 2$^{nd}$ NE without either adding another traffic signal at that idle tone wavelength at the 2$^{nd}$ NE, or maintain power (for example, by utilizing a local idle tone source). It is noted that this constraint (and therefor step 736) is not needed if the 2$^{nd}$ NE is a terminating node for the entire section (in other words, it does not include an egress optical section, but effectively drops all traffic).

Some embodiments can allocate traffic to an idle tone wavelength when the source and destination of the idle tone is the same as source and destination of the service request. For example, if the new service request 710 has the same source and destination address as the source and destination address of an idle tone connection (i.e., a connection established by the RSA which just includes power but no data), the traffic may be allocated to that idle tone wavelength. Some embodiments can implement such a feature using a connectivity matrix for idle tone connections based on optimizing the number of idle tones used to carry data and also considering the utilization of different paths in the network in order to allow more utilization of the idle tone wavelengths for traffic.

It should be appreciated that a hybrid approach may be utilized in which some of the NEs in the OCS are equipped with a configurable idle tone source, but others (for cost reasons) are not. The PCE will be aware which NE's can provide optical power at all (or a subset) of the idle tone wavelengths, and make its RSA decisions accordingly. For example, for a new traffic request between a source and destination node, some embodiments would only assign such a request to an idle tone wavelength if both the source and destination are matched with a previous routing of the idle tone as a non-traffic channel (i.e., has power but no traffic). However if some of the nodes are equipped with configurable idle tone sources (for example, as discussed above with reference to FIG. 3), than the RSA can assign the new traffic request to an idle tone wavelength even if only one of the source and destination match in some circumstances. For example, assume the RSA has routed an idle tone as a non-traffic channel from a source (node 1) to a destination (node 3) through an intermediate network element (node 2). For a new request to add traffic from node 1 to node 2, the RSA could assign the traffic to the idle tone wavelength between node 1 and node 2, if node 2 is suitably equipped to provide optical power at the idle tone wavelength at its egress port. In which case the RSA would send instructions to node 2 to provide optical power at the idle tone wavelength at its egress port.

Further, in some embodiments, the process of selecting a wavelength for a channel add request can consider using idle tone wavelengths for traffic channels between NEs which are equipped with such an idle tone source, to facilitate maintaining optical power at those wavelengths when the traffic is subsequently deleted. This can be useful for OBS, as discussed above. Accordingly the PCE can route short bursts of optical data using such an approach.

Further, this can help reduce the cost and complexity of the configurable idle tone power sources, at least for some NEs. In the embodiment illustrated in FIG. 3, the idle tone source was capable of providing power to each idle tone wavelength. While this enables a section based approach or ensuring each section can always provide power to each idle tone, this comes at the expense of including sufficient lasers to maintain power on each idle tone. In some embodiments, the NEs can be equipped with a configurable idle tone source with fewer lasers, which can only provide power to a subset of the idle tones. This subset can be fixed, if fixed frequency light sources are used. In other embodiments a number (X) of tunable sources are used. This implies that the NE can supply power to X idle tones, which can be any X idle tones. This information can be stored in the PCE database 650, and can provide constraints on the RSA process utilized by the PCE 630.

As stated above with reference to step 720 of FIG. 7, some embodiments can utilize distribute load balancing when selecting a wavelength to satisfy a request. As an example, some embodiments can divide the spectrum into N wavebands with each waveband centered by an idle tone. As an example, the RSA function can select a waveband with least loading. The loading can be defined as the number of traffic channels on that waveband divided by the total number of wavelength channels in that waveband.

A third aspect of the disclosure is directed to method and systems that utilize the broadcast ability of ROADMs to maintain optical power at the idle tone wavelengths throughout a domain, or potentially throughout the OCS.

Figure 8:
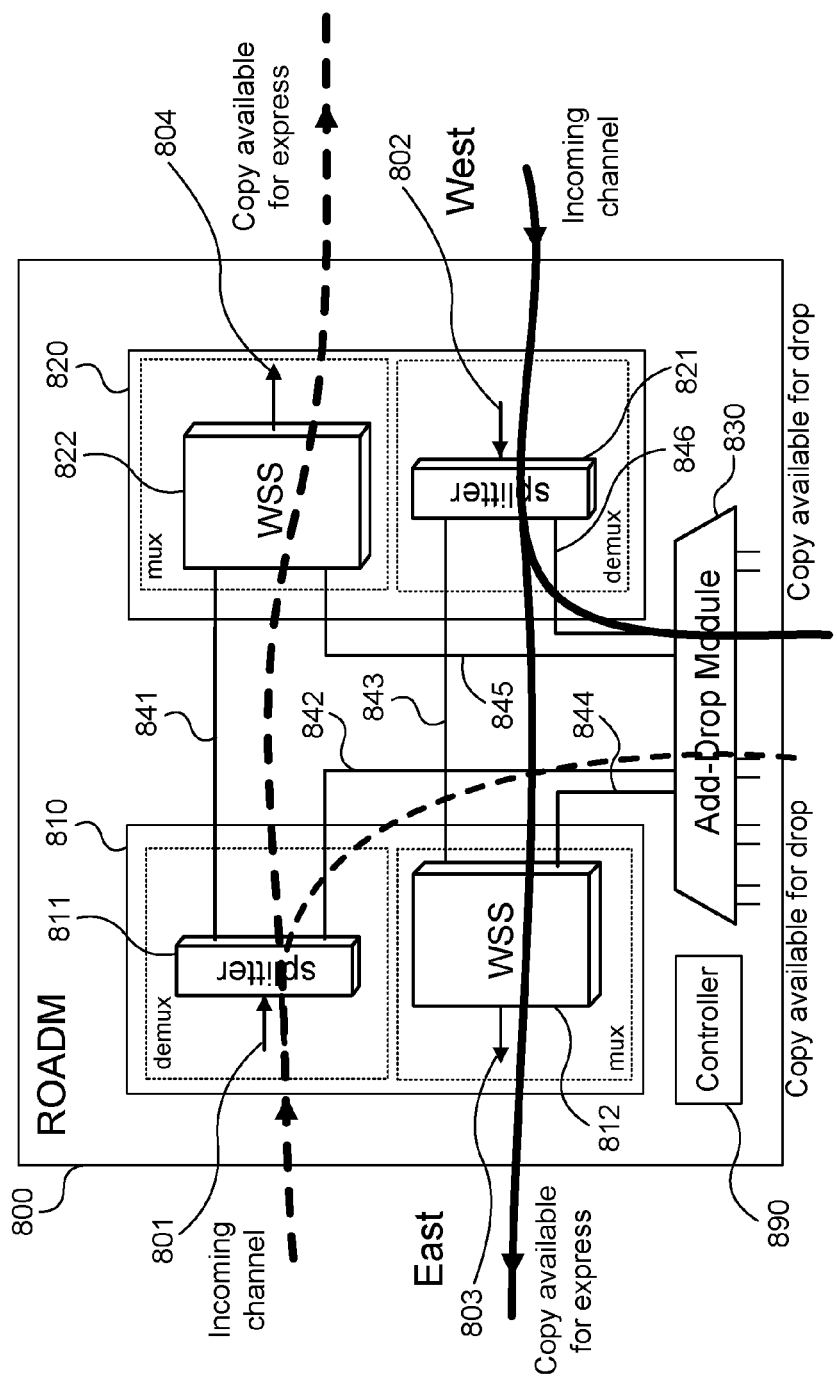
FIG. 8 illustrates a 2-degree ROADM including passive splitters in the De-Multiplexer (DEMUX) direction and wavelength selective switches (WSS) in the Multiplexer (MUX) direction, according to an embodiment.

FIG. 8 illustrates a 2-degree ROADM including passive splitters in the De-Multiplexer (DEMUX) direction and wavelength selective switches (WSS) in the Multiplexer (MUX) direction, according to an embodiment. In this example, the ROADM 800 includes a passthru section for passing through a number of wavelength channels from input fiber 801 to output fiber 804 and input fiber 802 to output fiber 803, an Add/Drop Module 830, and a controller 890. The passthru section includes two sets of Multiplexer (MUX) and De-Multiplexer (DEMUX) devices 810 and 820. In the embodiment shown in FIG. 8, wavelength selective switches (WSS) 812 and 822 are used for the MUX operation (and also to selectively route wavelength channels to the appropriate destination) and passive splitters 811 and 821 are used for the DEMUX operation. However, other embodiments can use alternative forms of multiplexers and de-multiplexers. The components in the ROADM 800 are interconnected via optical links 841-846, which are schematically illustrated in FIG. 8. It should be appreciated that the splitter 811 provides a copy of DWDM wavelength channel present at 801 to both the add/drop module 830 and to the WSS 822. Similarly, the splitter 821 provides a copy of DWDM wavelength channels present at 802 to both the add/drop module 830 and to the WSS 812. As this is a 2-Degree ROADM there is only 2 WSS. However, in general each splitter would send a copy of each signal to each WSS without filtering as the ROADM is operating in broadcasting mode. It should be appreciated that this is a simplified figure and that a ROADM may include a variety of components between splitters and WSS including but not limited to fibers, dispersion compensation fibers (DCFs), dispersion compensation modules (DCMs), etc. However to simplify the figure, a single schematic connection 843 is shown. Further, to simplify the figure, interconnections between the controller 890 and the other components are not shown. The incoming wavelength channels are received by the ROADM 800 via input optical fibers 801 and 802, depending on the direction of the incoming signal received. The incoming signal include traffic wavelength channels carrying data and can also idle tone wavelength channels produced by an idle tone source. In other words, copies of incoming wavelength channels including idle tone wavelength channels are available for all other express directions as well as for local drop due to the passive splitters 811 and 821.

The ROADM architecture illustrated in FIG. 8 is an example for a 2-degree node based on a WSS and passive splitter architecture in which optical wavelength channels are passed through the express link or dropped through the Add/Drop Module. This architecture can be extended to 'M-degree' node (ROADMs) which covers 'M' directions in the optical network, with M typically being 2, 3 or 4 and in most cases has a maximum value of 8. The WSS, under control of the controller 890, filters the interconnections to route each wavelength channel to the appropriate destination (s). The filter ability of the WSS is controlled by the controller 890 based on instructions from a network controller, such as an RSA function. Typically, each wavelength channel is only transmitted in one direction. However, it should be appreciated that an optical wavelength channel received at a DEMUX port of the ROADM can be broadcast in multiple directions. Typically, the filter ability of the WSS is used to ensure that wavelength channels carrying traffic in one direction do not loop back and collide with the same wavelength channel in another direction or other sections of the network. Embodiments utilize the broadcast ability of such a ROADM to broadcast the idle tone wavelength channels so that each section includes power to each idle tone wavelength channel of the set.

Figure 9:
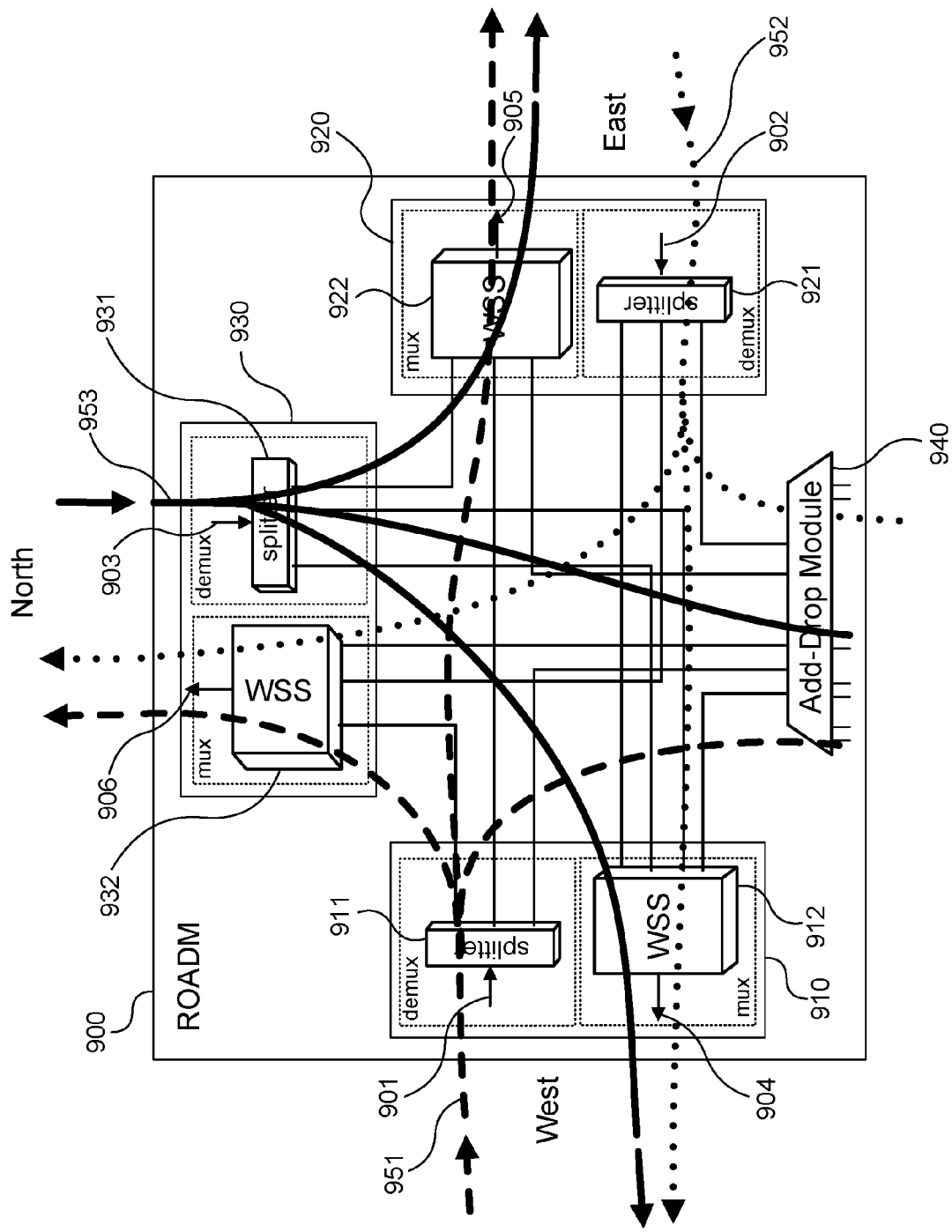
FIG. 9 illustrates an example 3-degree ROADM, according to an embodiment.

FIG. 9 illustrates an example 3-degree ROADM, according to an embodiment. The overall architecture of the ROADM 900 illustrated in FIG. 9 is similar to that of the ROADM 800 in FIG. 8 except that the ROADM 900 comprises a DEMUX/MUX module 930, in the North direction. ROADM 900 also includes additional internal optical links in order to interconnect the module 930 with the other DEMUX/MUX modules (module 910 and module 920) and the Add/Drop Module 940. With the additional set of DEMUX/MUX module 930, the ROADM 900 is able to broadcast wavelength channels in three ways (two for the remaining directions (east and west) and the way towards the drop module 940 directions. Splitters (911,921,931) inside the modules 910, 920, and 930 provide the broadcast feature inside the nodal architecture of the ROADM as illustrated in FIG. 9. For idle tones (similar to WDM traffic channels) such broadcasting can be extended to the lines (directions east, west and north here i.e., network level) by properly applying filtering in the corresponding WSS modules (912,922,932). Incoming wavelength channels are received by the ROADM 900 at one of the input optical fibers 901, 902 and 903. Each splitter 911, 921 or 931 will split the received DWDM signal into its component wavelength channels and transmit each wavelength channel to each MUX (i.e. the two WSSs in the other directions), as well as being able to drop wavelength channels directed to a local destination via the add/drop module 940. For example, an incoming signal 953 (the solid line in FIG. 9) is split by splitter 931. The split wavelength channels are routed through WSS 912 and WSS 922 for express and delivered to the Add/Drop module 940 for local drop. In other words, copies of each wavelength channel (including the idle tone wavelength channels) can be available in all output directions (lines) in the ROADM, subject to filtering by each WSS. In some embodiments, each WSS is configured not to filter the idle tone wavelengths. In other words, the ROADM is configured to broadcast the copied idle tone wavelength channels to the appropriate directions (lines) within a network. Accordingly, power is provided for each idle tone wavelength channel in each optical network section by providing at least one initial source and by each ROADM subsequently broadcasting the power on the idle tone wavelength channels.

Figure 10:
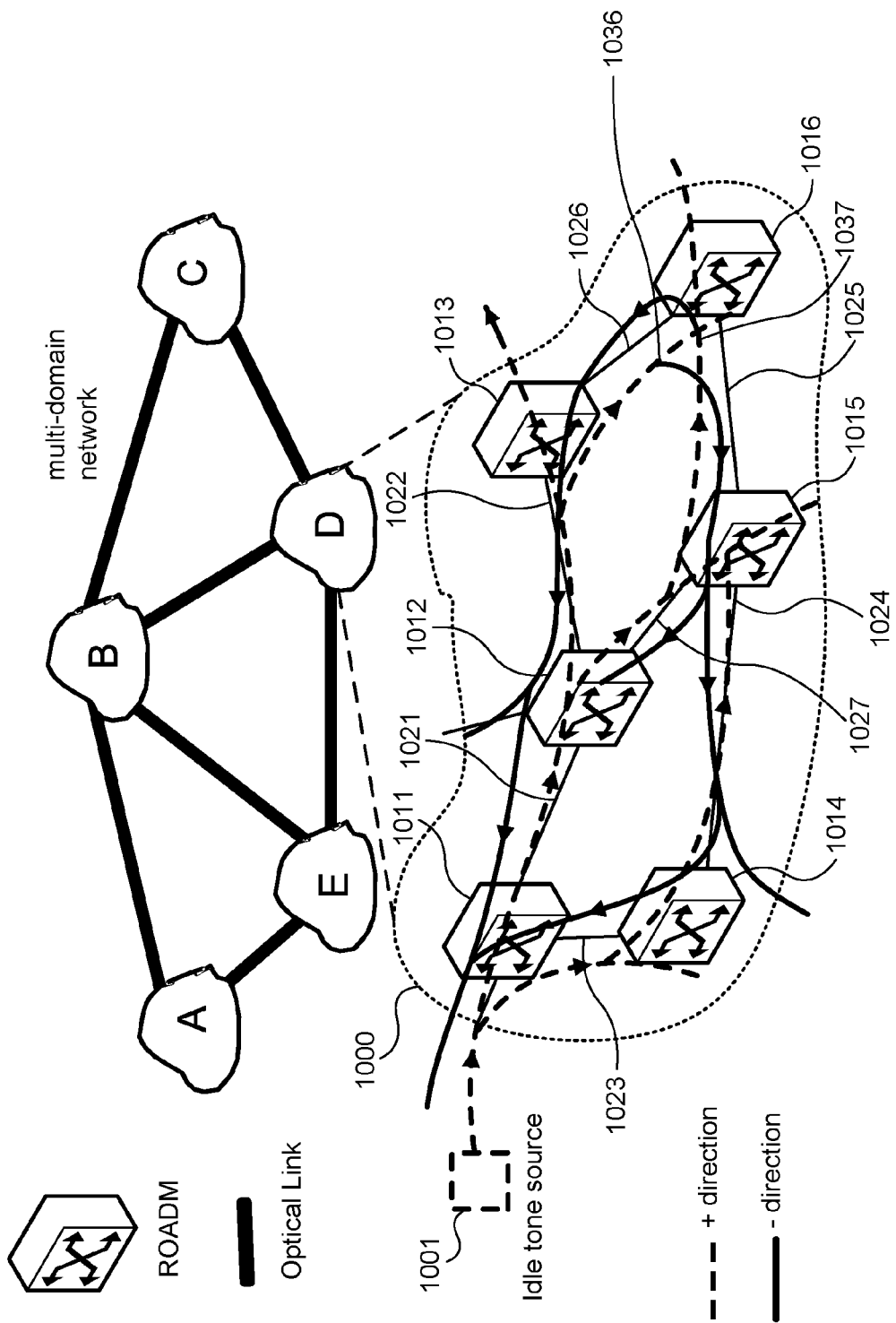
FIG. 10 is a network level view that illustrates how idle tone wavelength channels are distributed across optical communication system (OCS) according to an embodiment.

FIG. 10 is a network level view that illustrates how idle tones are distributed across optical communication system (OCS) according to an embodiment. The various network elements in FIG. 10 are similar to those of the physical network 660 illustrated in FIG. 6, with the addition of an idle tone source 1001. The physical network can be divided into a plural of domain networks A, B, C, D and E as illustrated in the upper part of FIG. 10. Each domain network includes multiple network elements such as ROADMs that are interconnected through optical links. The lower part of FIG. 10 is an enlarged view of a domain network 1000 illustrating various components in the domain network D. The domain network 1000 includes a plurality of ROADMs 1011-1016 that are interconnected by optical links 1021-1027, each of which may include one or more optical amplifiers depending on the distance between nodes/ROADMs. The optical amplifiers may include, for example, optical fiber amplifiers such as EDFAs, semiconductor optical amplifiers (SOAs), etc.

FIG. 10 includes the idle tone source 1001. Although a single idle tone source, 1001, is illustrated in this example, it should be appreciated that each network domain can include additional idle tone sources. The idle tone source 1001 is a multi-tone optical source that produces optical power at each of the idle tone wavelengths. Suitable network controllers (e.g. PCE, Transport SDN controller, domain/sectional optical controllers (DOC/SOC), etc.) can configure the ROADMs to balance the spectrum across the network by employing the broadcast feature of each ROADM node as discussed above with reference to FIGS. 8 and 9. Each ROADM, for example the filtering employed by the WSSs, is configured by the PCE. The idle tone signals produced by the idle tone source should be within the spectral range of WDM components in order to be treated in a similar manner to wavelength channels carrying data by ROADMs and amplifiers (EDFAs in this case). In some embodiments, a single idle tone source is used, whereas other embodiments can deploy a few hardware idle tone sources. In any event, a small number of sources can generate idle tones that can cover the entire network domain using the broadcast feature of ROADMs. This reduces the cost of having to deploy hardware capable of producing multiple idle tones at a set of idle tone wavelengths at each node/ROADM. This can be particularly pertinent for existing networks that are already deployed, as it reduces the need to install additional hardware at every node, when compared to embodiments discussed with reference to FIG. 3. However, for many embodiments this comes at the cost of spectral efficiency as many embodiments would prohibit the use of the idle tone wavelengths for traffic when using such a broadcasting approach. However, some embodiments could utilize suitable filtering and RSA software to allow the idle tones to carry data in some sections when such a broadcasting approach is utilized, for example, when some nodes include a configurable idle tone source as described above.

FIG. 10 illustrates an example of a single idle tone source 1001 used to distribute optical power at the set of idle tone wavelengths across the entire network domain 1000 in both directions. It should be appreciated that each optical link (optical link 1021-1027) may include an optical fiber for each direction, but only a single link is illustrated that to avoid cluttering the figure. FIG. 10 shows that the optical power at the idle tone wavelengths produced by the idle tone source 1001 can flow in both "+" (dashed line) and "−" (solid line) directions over every optical link (optical link 1021-1027) which interconnects the ROADMs (ROADM 1011-1016) in the network domain 1000. Further, the filtering function of the WSSs in some of the ROADMs can be configured to loop back the idle tones from one direction to the other as illustrated in FIG. 10 for the case of 1016. For example, ROADM 1016 receives power on the idle tone wavelengths from ROADM 1013 on link 1026 in the "+" (dashed line) direction and on link 1025 (from ROADM 1015) in the "+" (dashed line) direction. In both cases, the ROADM 1016 loops back these signals onto the fiber in the opposite direction. This is shown schematically at transition junctions 1036 and 1037 where the idle tones switch from the "+" (dashed line) direction to the "−" (solid line) directions, but it should be appreciated that these transitions occur within the ROADM 1016. It should be appreciated that the choice of locations where loop back is performed is a design issue and can be simply customized. Additionally the ROADMs can be customized to use the broadcast feature in a single direction (or a subset of the directions, depending on the number of degrees). As an example, it is noted that ROADM 1012 employs the broadcast feature in "+" direction but not the "−" direction. This is to avoid interference of idle tones in the segment 1021 in the "−" direction as ROADM receives the idle tones from both segments 1022 and 1027. Accordingly, each ROADM can be configured in different ways by the domain controller (or PCE or SDN controller) to employ the broadcasting feature to ensure that there is power in each idle tone wavelength channel in each section.

In some embodiments, the broadcast feature is effectively used for the idle tones to support both directions in each link via software/control applied to ROADMs by a controller such as a PCE or some other controller. This is possible for all links in FIG. 10 due to the mesh nature of the domain 1000 as illustrated in FIG. 10 where each node has a minimal degree of two. This may not be applicable to all networking scenarios where some nodes (ROADMs) have only one degree (i.e., they are connected to only one ROADM). This is especially true for edge nodes and or nodes that have not yet been upgraded. In such cases the support of idle tones for both directions for the corresponding node can still be supported by using additional hardware (or manual) component (or actions) for such one-degree edge nodes, as will discussed below with reference to FIG. 15. In particular, in such cases, internal physical loopbacks can be provided by loopback connectors or simply directly connecting one splitter output port to the corresponding WSS input port via patchcord fibers or loopback connectors. Other embodiments may use a different idle tone source at the corresponding node for the support of other direction, which can also help provide redundancy.

Figure 11A:
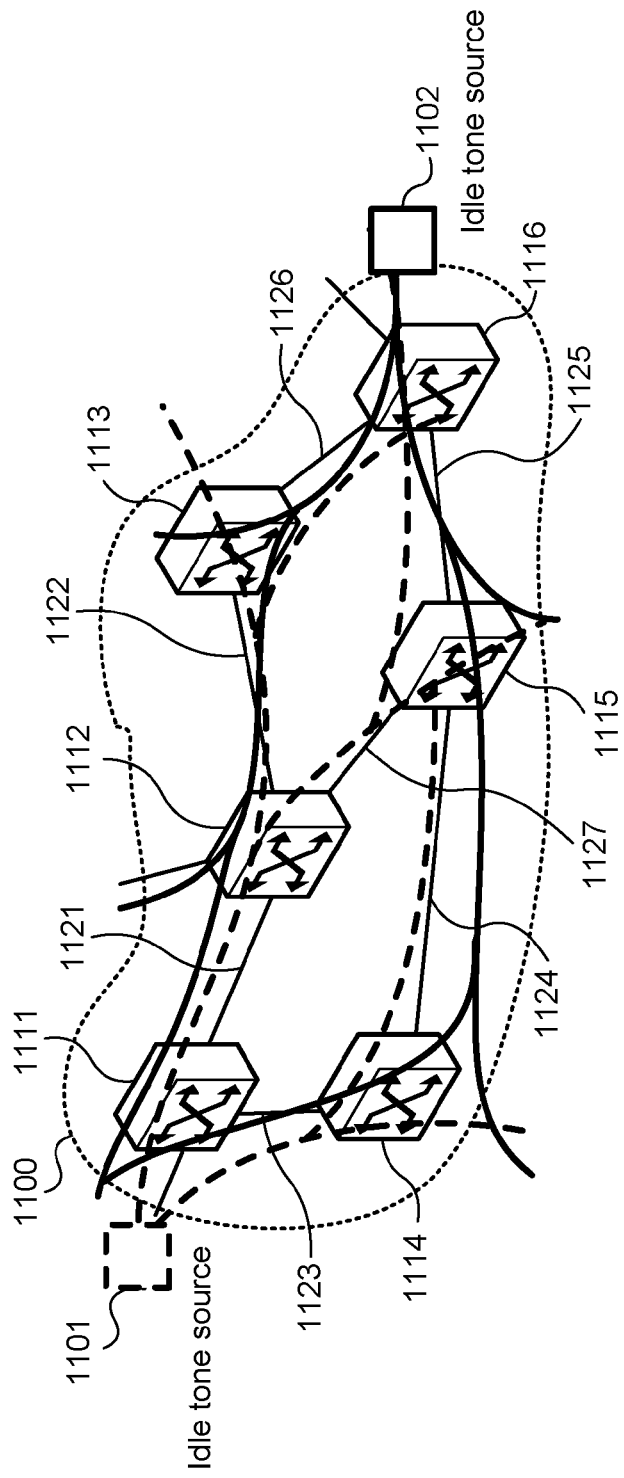
FIG. 11A and FIG. 11B are two network level views that illustrate an example for fault recovery, according to an embodiment.
Figure 11B:
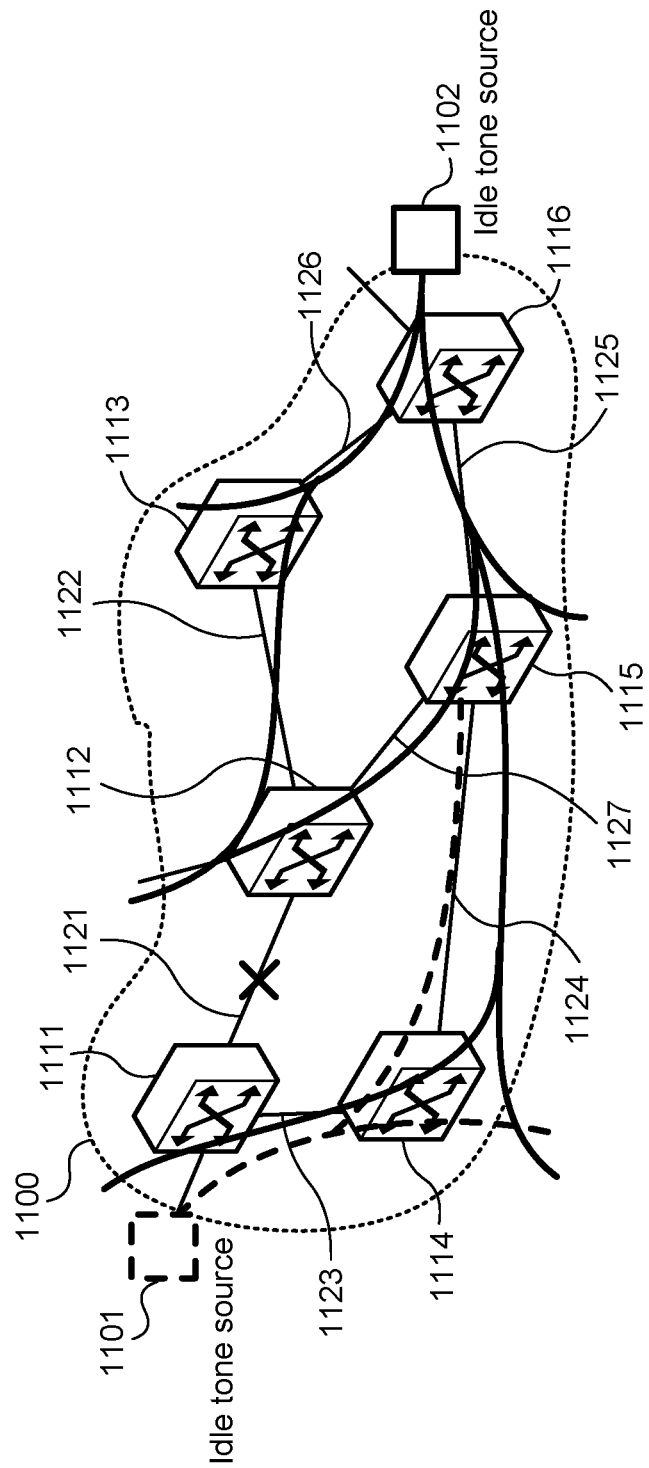

FIG. 11A and FIG. 11B are two network level views that illustrate an example for fault recovery, according to an embodiment. Faults in an OCS can include any loss of one or more channel signal wavelengths due to an unexpected/ unplanned outage as a result of an equipment failure or optical fiber cut. Note that the numbered components in both upper and lower figures are identical but they may represent different status in each scenario. Additionally the lines corresponding to the spectral occupation as a result of both idle sources 1101 and 1102 are reflecting bi-directional spectral coverage as discussed in FIG. 10 whereas in FIG. 11 for simplicity direction is excluded from the illustration. In particular, FIG. 11A illustrates the network prior to a fault. FIG. 11B illustrates the network after a fault occurs in section 1121. The example domain network system 1100 in FIG. 11 is similar to the example network domain 1000 in FIG. 10, except that the network domain 1100 includes multiple idle tone sources (idle tone sources 1101 and 1102). In FIG. 11, the two idle tone sources are shown at geographically different locations, but in other embodiments, the two sources may be located at the same node. They can be practically implemented in a single hardware card (module) to support two sets of idle tones as discussed in the following. In some embodiments, a ROADM or other node that includes a configurable idle tone source, such as discussed above with reference to FIG. 3, can be used as a single source for the idle tones. Further, the configurable idle tone source can be modified to produce dual half tones, for example with a different selection of laser diodes.

Figure 12:
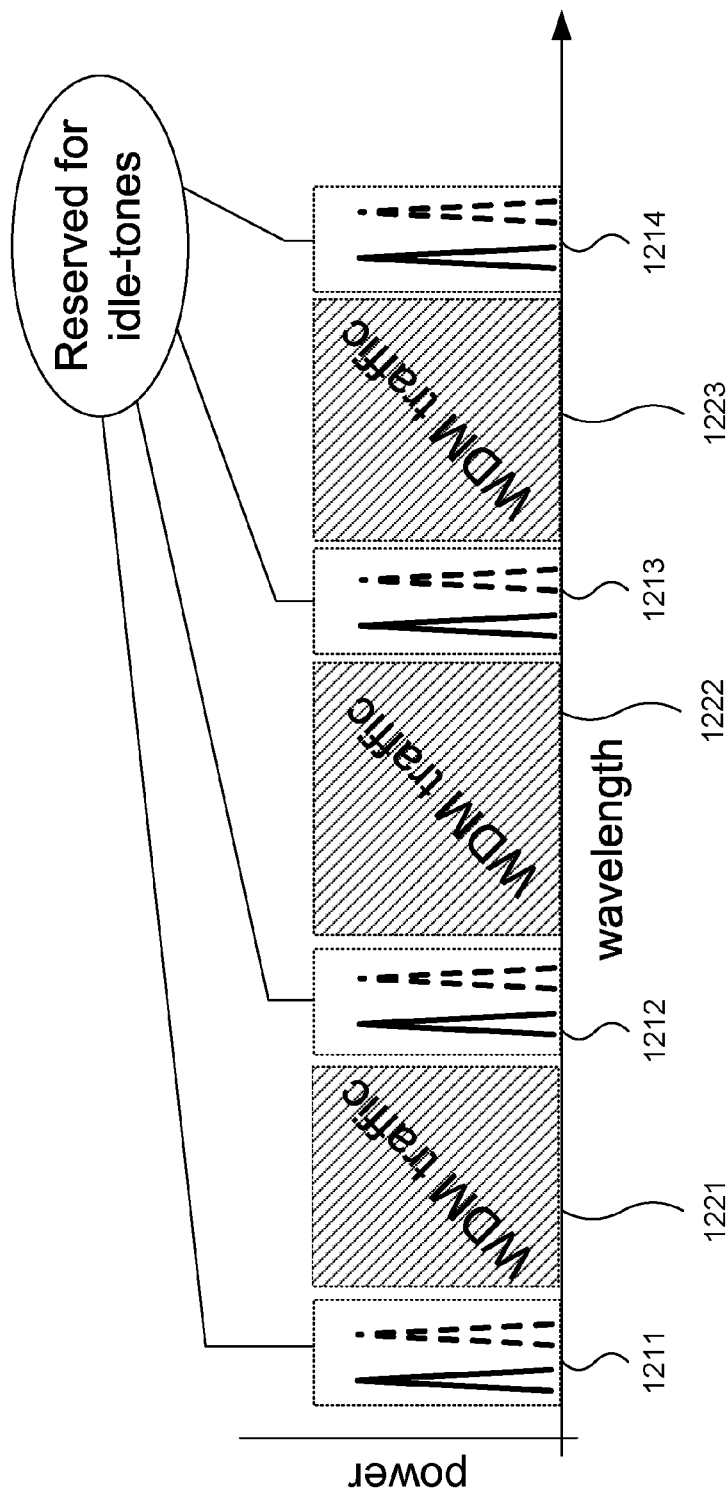
FIG. 12 is an illustrative example of fixed waveband reservation for idle tone wavelength channels, according to an embodiment.

For the purpose of ensuring redundancy in the event of a fault, the two idle tone sources 1101 and 1102 can each produce half tones, as illustrated by example in FIG. 12. FIG. 12 illustrates that there are two idle tone half tones occupying the spectrum allocated to each idle tone, such that the bandwidth (GHz) is shared when the two idle tone half tones co-exist. In other words, each half tone would occupy half of the spectrum allocated to the idle tone. This allows two idle tones to co-exist while utilizing the spectrum of a single wavelength channel in the context of ITU grid based networks where the spectrum allocated for each WDM channel is fixed and known in advance (50 GHz or 100 GHz). Further, it is noted that providing power to a single half tone is sufficient to preform a spectral hole and hence minimizing the nonlinear amplifier spectral gain behavior during a change in spectral occupancy resulting from a WDM channel add/drop or during unplanned failure events. Accordingly, redundancy is obtained by providing power to a single half tone for each of the set of idle tone wavelengths is sufficient to prevent additional SHB effects from resulting in response to changes to the spectral occupancy. Accordingly, providing power to both half tones for each idle tone adds redundancy without further reducing spectral efficiency for fixed grid applications, remembering that for most embodiments, the idle tone wavelengths cannot be utilized for traffic when this broadcasting approach is used. The presence of idle tones may affect the spectral efficiency of the network in case of static wavebands reservation for idle tone for both flex grid and flexible bandwidth network.

In this example, idle tone source 1101 (shown in dashed lines in FIGS. 11A and 11B) produces power to the dashed half tones of FIG. 12. Similarly idle tone source 1102 (shown in solid lines in FIGS. 11A and 11B) produces power to the halftones illustrated with solid lines in FIG. 12.

Accordingly, the network domain 1100 consists of a plurality of network elements such as ROADMs 1111-1116. The ROADMs are connected each other by optical links 1121-1127 each of which may include one or more EDFAs depending on the distance between nodes/ROADMs.

FIG. 11A represents the ordinary scenario when the entire network domain 1100 is operating normally with all connections between network elements are in an operational state. As all optical links include power to two half tones for each idle tone wavelength channel in both directions, redundancy exists over the domain network.

FIG. 11B illustrates an example of how the existing redundancy allows the system to maintain optical power at the set of idle tone wavelengths in the event of a fault and restoration. In this example, when a fault occurs between the ROADMs 1111 and 1112, e.g., due to optical fiber cut at link 1121, the idle tone (shown in dashed lines) produced by the idle tone source 1101 can flow in optical links 1123 and 1124 but cannot flow in the optical links 1121, 1122, 1125 and 1126. However, the idle tone half tones produced by the source 1102 are still able to flow in optical links 1122-1127. In other words, the optical links that are not provided power at the idle tone wavelengths from the idle tone source 1101 will still be provided power from the idle tone source 1102. As a result, this allows for restoration and fault recovery without (or with minimal) disrupting the gain of the EDFAs in the network, due to the continued presence of power to the set of idle tone wavelength channels. As stated, this is just an example of how a single cut may result in different spectral occupation per optical link after a fault happens based on the configuration of the ROADMs illustrated in FIG. 11. It should be noted that the actual results can depend on the topology and the detailed considerations and customizations of the broadcast feature applied to the ROADMs by PCE or RSA for instance within the network.

FIG. 12 illustrates spectral occupancies of each idle tone wavelength channel when half tones are used, according to an embodiment. FIG. 12 illustrates that there are two idle tone "half tones" occupying the spectrum allocated to a single idle tone, such that the bandwidth (GHz) is shared when the two idle tone half tones co-exist.

FIG. 12 is an illustrative example of fixed waveband reservation for idle tones, according to an embodiment. In fixed waveband reservation, unlike dynamic wavelength reservation, an example of which will be discussed below with reference to FIG. 13, idle tone wavelengths are fixed in advance and will not be changed over time. It should be appreciated that FIG. 12 does not show the entire range of optical network spectral band but only represents a part of the spectrum band. Referring to FIG. 12, the four areas 1211, 1212, 1213 and 1214 represent ranges of wavelengths reserved for idle tones. Each area is surrounded by dotted lines and has half tones sharing the same bandwidth. The half tones may be produced by two different idle tone sources as illustrated in FIG. 11. Multiple wavelength channels that can carry traffic signals exist in each of the wavebands (hashed areas) 1221, 1222 or 1223. The width of each hashed area represents separation between two neighboring idle tone wavelengths located at the two ends of the hashed area. The spacing between any two idle tone wavelengths depends on whether uniform spacing is used. As discussed above, due to the fact that SHB is wavelength dependent, the width of each waveband i.e., the number of wavelength channels that can separate idle tone wavelengths can vary as a function of wavelength. As previously discussed, in order to simplify the system, the minimum width observed for spectral hole burning can be used for the spacing between two neighboring idle tones. In such a system, the spacing is uniform throughout the spectral band. In other words, in a simple system, idles tones are evenly distributed throughout the spectral band and the spacing, and therefore the width for each WDM traffic waveband 1221, 1222 and 1223 should be 2 nm or less. However, as the width of the spectral holes varies with wavelength, the minimum spacing between two neighboring idle tone signals can be changed depending on wavelengths. Generally, the width of the spectral holes is wider for greater wavelengths so that it is possible to have spacing wider than 2 nm between two neighboring idle tone signals.

As stated, for some embodiments, idle tones are not used to carry traffic. However, when capacity reaches the point where no other WDM channels are available for traffic (in other words, when all of the wavelength channels allocated to data are carrying data), then all of the spectral holes will be pre-formed. At this point, the RSA can start using spectrum reserved for idle tone signals to allocate to WDM traffic signals. In other words, initially the RSA would reserve idle tone wavelengths and not use them for traffic. However, when the system approaches full capacity the RSA can release the idle tone wavelengths for traffic.

Figure 13:
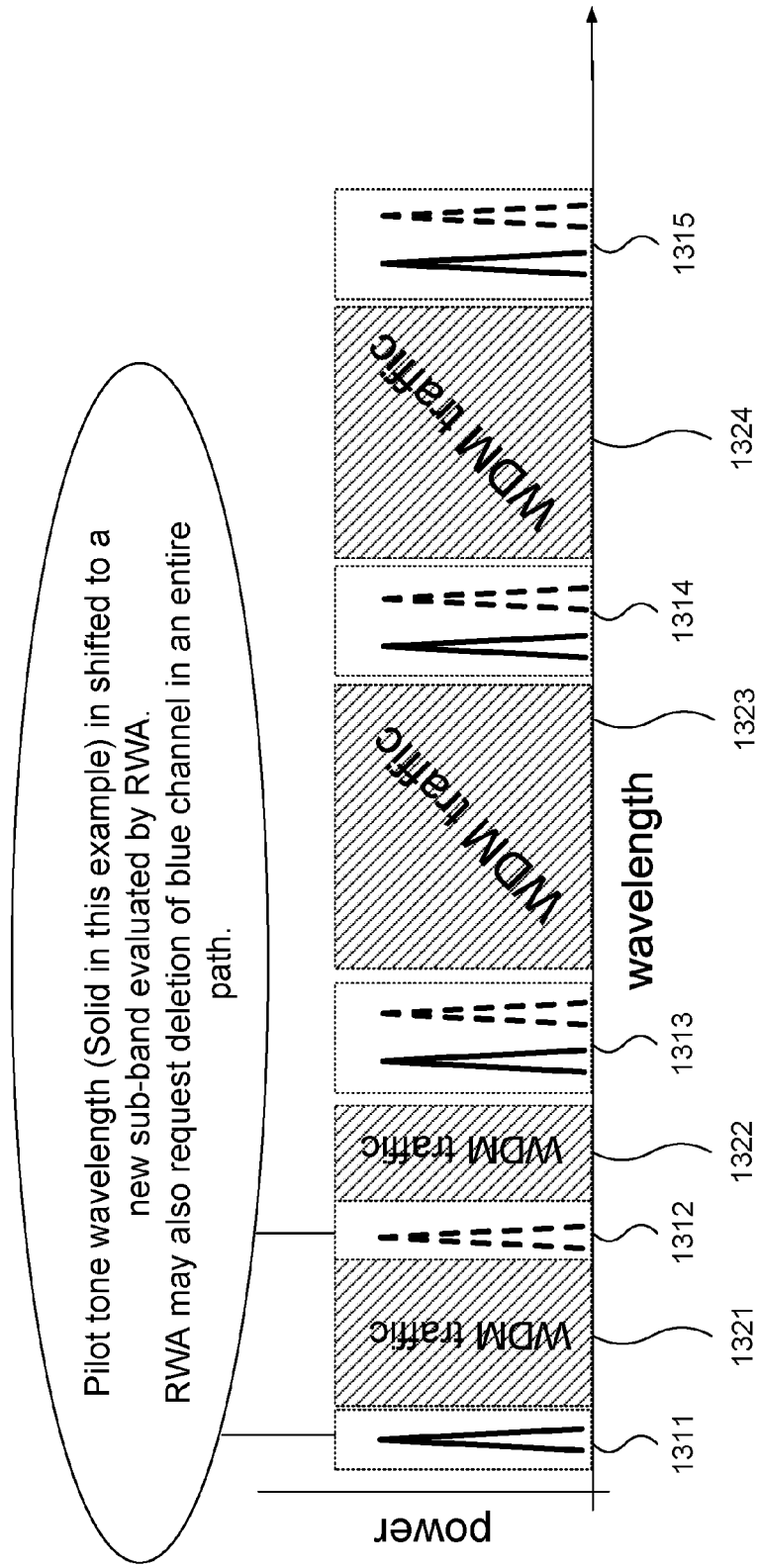
FIG. 13 is an illustrative example of dynamic wavelength reservation according to an embodiment.

FIG. 13 is an illustrative example of dynamic wavelength reservation according to an embodiment. At least some optical systems use dynamic wavelength assignment to increase efficiency of the entire network system. In those systems, depending on the physical network structure and the network connections, wavelengths for traffic signals can be allocated dynamically in real time for the purpose of optimization. As a result, idle-tone signals may need to be shifted to new wavelengths to ensure the spacing between two neighboring signals do not create additional spectral holes. In order to avoid such situations, a management layer (for example an RSA function) may control idle tone wavelengths used by each idle tone source in the corresponding region to dynamically fill the spectrum as necessary. In addition, the idle tone sources in FIGS. 10 and 11 should be tunable to adjust the idle tone wavelength channels when dynamic wavelength reservation is utilized.

Again, it should be appreciated that the wavelength spacing between two neighboring idle tones may vary depending on the wavelength of the band where each idle tone is allocated by the RSA. Accordingly, the RSA should ensure the spacing between any two neighboring idle tone signals should be less than the minimum width of any potential spectral hole for that wavelength to ensure that the amplifier is behaving more linearly and nonlinear effects are minimized as much as possible. By doing so, the system ensures that there is no further SHB across the entire spectral band.

Figure 14:
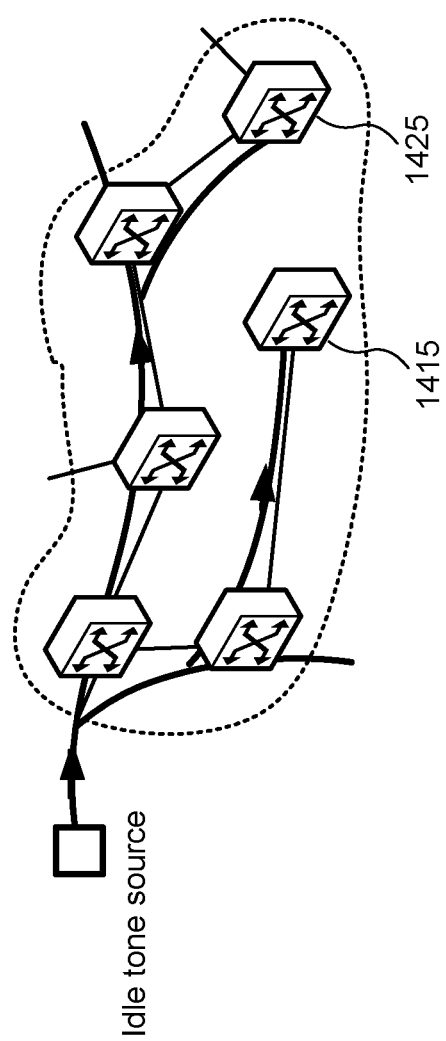
FIG. 14 shows a different network than the network illustrated in FIG. 10.

Embodiments have been discussed which can utilize the broadcast feature of ROADMS which utilize a MUX architecture which includes filtering (such as used by a WSS). Indeed the broadcast can be easily used by properly controlling ROADMs to extend the broadcast feature provided by internal passive splitters within the node to the lines interconnecting the network elements. Some embodiments are configured assuming the meshiness of the network, meaning that all nodes have a degree of at least two where network level broadcasting can be applied via software control (executed by a processor of the PCE/RSA). In scenarios where there are nodes with degree one (i.e., the corresponding node is only directly connected to a single node), the broadcast feature cannot be applied to support the idle tone presence in both direction of the links, especially for the link associated with the one-degree node, without additional features. As an example FIG. 14 shows a different network than the network illustrated in FIG. 10. In the network configuration illustrated in FIG. 14, nodes 1415 and 1425 have only one link connecting them to other nodes. For simplicity, the numbering of the remaining nodes of FIG. 14 is omitted. The solid line with arrows shows the direction where the idle tones are present using the broadcast feature in ROADMs. However the broadcast is not effective in the reverse direction, in that the nodes 1415 and 1425 do not receive the idle tones from other nodes in the reverse direction. Accordingly, some embodiments utilize a loopback feature by having a physical connection (i.e., loopback) at the ROADMs 1415 and 1425 to provide power to the idle tones in the reverse direction. Typically a ROADM is not configured to loopback a signal received from a direction (e.g. East) to route the same signal back to the same direction (e.g., East). Unless the ROADMs 1415 and 1425 can be configured via software to implement such a loopback, than a hardware loopback can be implemented. The hardware loopback can be supported by physically connecting one of the demux output ports of the ROADM to the one of the Mux ports of the corresponding ROADM. In some embodiments, "loopback connectors" or fiber patchcords can be used to implement such a loopback. Such situations are usually applicable to networks with linear or tree link topology where there exists nodes with degree "one". Until the corresponding nodes are upgraded to support higher degrees and hence be part of a meshier network this strategy can be used to support the idle tones in both directions.

For nodes that are capable of broadcasting, but do not use a WSS (or some other architecture that uses filtering), the broadcasting may create some power instability due to the interference of phase-shifted versions of the idle tones. This can occur in nodes that do not have the reconfigurability feature. Indeed in such networks the nature of WDM channel topology is assumed to be nearly static with minimal failure recovery requirements (otherwise ROADMs have to be deployed where smart hardware and software can be used for an intelligent networking). Therefore, there are limits to the types of network topologies which can use the broadcasting feature to adequately distribute the idle tones. Due to the broadcast nature in Mux and Demux in such networks the existence of links creating loops can limit the applications of the broadcasting feature for such networks. In such networks idle tone solutions can be adopted to have one source per node (where sources are orthogonal in frequency/wavelength) if necessary to avoided and looping and instability.

Figure 15:
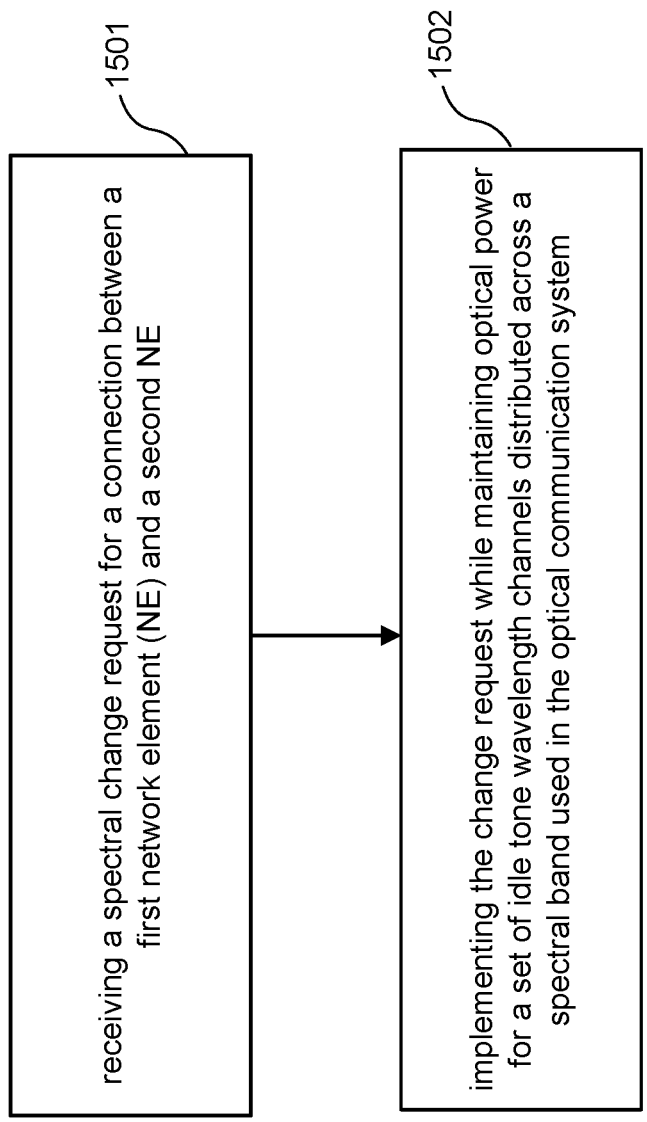
FIG. 15 illustrates a method of routing wavelength channels in an optical communication system (OCS) according to an embodiment.

FIG. 15 illustrates a method of routing wavelength channels in an optical communication system (OCS) according to an embodiment. Such a method includes, at step 1501, receiving a spectral change request for a connection between a first network element (NE) and a second NE. The method further includes, at step 1502, implementing the change request while maintaining optical power at a set of idle tone wavelengths distributed across a spectral band used in the optical communication system. Such a method can be executed by a processor of suitable controller, for example a PCE or some other network controller including an RSA function such as a transport SDN controller, or optical burst switching controller.

Figure 16:
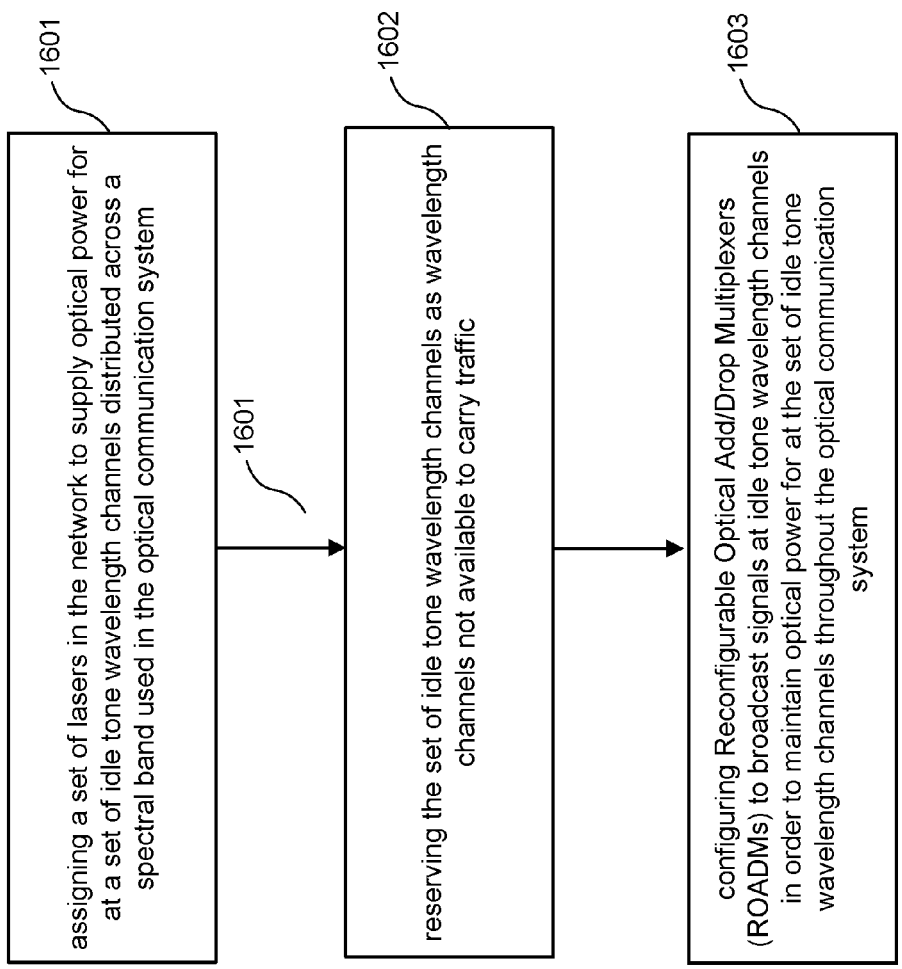
FIG. 16 illustrates another method of routing wavelength channels in an optical communication system (OCS), according to another embodiment.

FIG. 16 illustrates another method of routing wavelength channels in an optical communication system (OCS), according to another embodiment. Such a method includes, at step 1601, assigning a set of lasers in the network to supply optical power at a set of idle tone wavelengths distributed across a spectral band used in the optical communication system. The method further includes, at step 1602, reserving the set of idle tone wavelengths as wavelengths not available to carry traffic. Such a method further includes configuring Reconfigurable Optical Add/Drop Multiplexers (ROADMs) to broadcast signals at idle tone wavelengths in order to maintain optical power at the set of idle tone wavelengths throughout the optical communication system. Such a method can be executed by a processor of suitable controller, for example a PCE or some other network controller.

Figure 17:
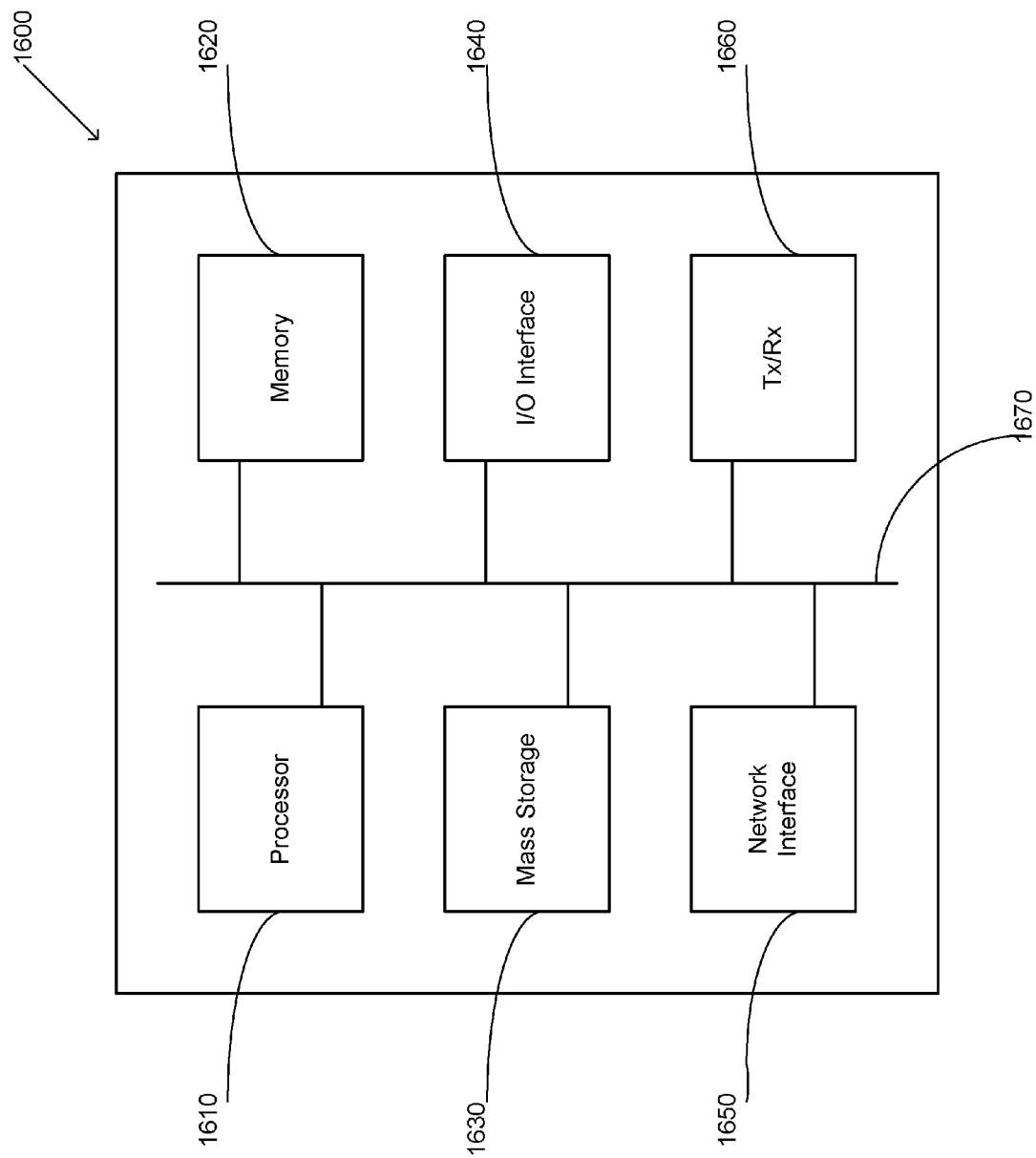
FIG. 17 illustrates a processing system according to an embodiment.

FIG. 17 is a block diagram of a processing system 1601 that may be used for implementing the network element controller, or domain controller. As shown in FIG. 17, processing system 1601 includes a processor 1610, working memory 1620, non-transitory storage 1630, network interface, I/O interface 1640, and depending on the node type, a transceiver 1660, which may include one or more optical transponders, all of which are communicatively coupled via bi-directional bus 1670.

According to certain embodiments, all of the depicted elements may be utilized, or only a subset of the elements. Further, the processing system 1600 may contain multiple instances of certain elements, such as multiple processors, memories, or transceivers. Also, elements of processing system 1600 may be directly coupled to other components without the bi-directional bus.

The memory may include any type of non-transitory memory such as static random access memory (SRAM), dynamic random access memory (DRAM), synchronous DRAM (SDRAM), read-only memory (ROM), any combination of such, or the like. The mass storage element may include any type of non-transitory storage device, such as a solid state drive, hard disk drive, a magnetic disk drive, an optical disk drive, USB drive, or any computer program product configured to store data and machine executable program code. According to certain embodiments, the memory or mass storage have recorded thereon statements and instructions executable by the processor for performing the aforementioned functions and steps.

The processing system 1600 can be used to implement a PCE, Transport SDN host or other controller which executes the various network functions described herein, for example the RSA function.

Through the descriptions of the preceding embodiments, the present disclosure may be implemented by using hardware only or by using software and a necessary universal hardware platform. Based on such understandings, the technical solution of the present disclosure may be embodied in the form of a software product. The software product may be stored in a non-volatile or non-transitory storage medium, which can include the device memory as described above, or stored in removable memory such as compact disk read-only memory (CD-ROM), flash memory, or a removable hard disk. The software product includes a number of instructions that enable a computer device (computer, server, or network device) to execute the methods provided in the embodiments of the present disclosure. For example, such an execution may correspond to a simulation of the logical operations as described herein. The software product may additionally or alternatively include number of instructions that enable a computer device to execute operations for configuring or programming a digital logic apparatus in accordance with embodiments of the present disclosure.

Although the present disclosure has been described with reference to specific features and embodiments thereof, it is evident that various modifications and combinations can be made thereto without departing from the disclosure. The specification and drawings are, accordingly, to be regarded simply as an illustration of the disclosure as defined by the appended claims, and are contemplated to cover any and all modifications, variations, combinations or equivalents that fall within the scope of the present disclosure.

The invention claimed is:

1. A method of routing wavelength channels in an optical communication system (OCS) comprising:
 receiving a spectral change request for a connection between a first network element (NE) and a second NE;

implementing the change request while maintaining optical power at a set of idle tone wavelengths distributed across a spectral band used in the optical communication system.

2. The method of claim 1 wherein implementing the change request comprises:
assigning traffic to a particular idle tone wavelength for the connection which is dropped at the second NE;
configuring the second NE to provide optical power to the particular idle tone wavelength at egress optical fibers.

3. The method of claim 2 wherein configuring the second NE comprises sending signaling to the second NE.

4. The method of claim 3 wherein the signaling configures the NE to provide optical power at the particular idle tone wavelength using a local laser.

5. The method of claim 2 wherein implementing the change request further comprises assigning traffic to the particular idle tone wavelength at the add port of the first NE.

6. The method of claim 1 wherein the minimum spacing between neighboring idle tone wavelengths of the set is no more than a minimum expected spectral hole burning characteristic of an optical amplifier used in the OCS.

7. The method of claim 6 wherein the optical amplifier comprises an erbium doped fiber amplifier (EDFA).

8. The method of claim 7 wherein the set of idle tone wavelengths has non-uniform spacing between neighboring members of the set.

9. The method of claim 8 wherein the spectral band is divided into N regions based on spectral hole widths in a gain profile of the EDFA for wavelength channels within each region, and the separation between idle tone wavelengths is no greater than the spectral hole width for each region.

10. The method of claim 1 wherein the change request is a request to delete a traffic signal and wherein implementing the change request comprises:
determining whether the traffic signal is assigned to an idle tone wavelength;
disconnecting the traffic signal; and
responsive to determining the traffic signal is assigned to an idle tone wavelength, configuring the first NE to maintain power to the idle tone wavelength.

11. The method of claim 10 wherein configuring the first NE to maintain optical power T the idle tone wavelength comprises instructing the first NE to maintain the laser assigned to the idle tone wavelength in the on state.

12. The method of claim 1 further comprising initially determining a set of connections through the network which includes available transponders to provide optical power at the set of idle tone wavelengths.

13. The method of claim 12 wherein the change request is a request to add traffic, and further comprising performing distributed load balancing to assign the traffic to a wavelength channel.

14. The method of claim 13 further comprising, responsive to the distributed load balancing assigning the traffic to the wavelength channel at the first NE, configuring the first NE to drop the wavelength channel at the ingress port of the NE and adding the traffic to the wavelength channel at the egress port of the NE.

15. The method of claim 12 wherein the change request is a request to add traffic to a connection between the first NE and the second NE, and further comprising:

determining an existing connection between the first NE and the second NE includes an idle tone wavelength which is provided optical power but does not carry traffic; and
assigning the traffic to the connection using the idle tone wavelength.

16. The method of claim 12 wherein the change request is a request to add traffic to a connection between the first NE and the second NE, and further comprising:
determining an existing connection between the first NE and a third NE through the second NE includes an idle tone wavelength which is provided power but does not carry traffic;
determining the $2^{nd}$ NE is equipped with a configurable idle tone power source capable of providing power at the idle tone wavelength at an egress port linking the $2^{nd}$ NE to the third NE;
assigning the traffic to the connection between the first NE and the second NE using the idle tone wavelength; and
sending instructions to the second NE to provide power at the idle tone wavelength at the egress port.

17. A method of routing wavelength channels in an optical communication system (OCS) comprising:
assigning a set of lasers in the network to supply optical power at a set of idle tone wavelengths distributed across a spectral band used in the optical communication system;
reserving the set of idle tone wavelengths as wavelengths not available to carry traffic; and
configuring Reconfigurable Optical Add/Drop Multiplexers (ROADMs) to broadcast signals at idle tone wavelengths in order to maintain optical power at the set of idle tone wavelengths throughout the optical communication system.

18. The method of claim 17 wherein configuring each ROADM further comprises configuring an edge node ROADM in a loopback mode such that powered idle tones received on a first optical fiber from a first direction are routed in a second optical fiber in the opposite direction.

19. The method of claim 17 configuring each ROADM further comprises configuring any ROADM which receives the same idle tone from more than one direction to apply filtering such that the same idle tone is not duplicated on any output optical fiber.

20. The method of claim 17 wherein the set of idle tone wavelengths includes a pair of half tone wavelengths for each member of the set such that there is a first half tone wavelength for a first direction and a second half tone wavelength for a second direction.

21. The method of claim 20 wherein assigning comprises assigning a first set of lasers to produce optical power at the first half tone wavelengths and a second set of lasers to produce optical power at the second set of half tone wavelengths.

22. The method of claim 21 wherein the first set of lasers is located at a first location and the second set of lasers is located at a second location.

23. The method of claim 21 wherein the first set of lasers is co-located with the second set of lasers.

24. The method of claim 21 wherein each set of lasers can be distributed across multiple locations.

25. A network controller for an optical communication system (OCS) comprising:
a processor; and machine readable memory storing instructions which when executed by the processor implements a routing and spectrum assignment (RSA) function configured to:

receive a spectral change request for a connection between a first network element (NE) and a second NE;

implement the change request while maintaining optical power at a set of idle tone wavelengths distributed across a spectral band used in the optical communication system.

26. The network controller of claim 25 wherein the minimum spacing between neighboring idle tone wavelengths of the set is no more than the minimum expected spectral hole burning characteristics of erbium doped fiber amplifiers used in the OCS.

27. The network controller of claim 26 wherein the RSA is configured to assign traffic to a particular idle tone wavelength for the connection which is dropped at the second NE;

configure the second NE to provide power to the particular idle tone wavelength at egress optical fibers.

28. A network controller for an optical communication system (OCS) comprising:

a processor; and machine readable memory storing instructions which when executed by the processor implements a routing and spectrum assignment (RSA) function configured to:

assign a set of lasers in the network to supply optical power at a set of idle tone wavelengths distributed across a spectral band used in the optical communication system;

reserve the set of idle tone wavelengths as wavelengths not available to carry traffic; and configure Reconfigurable Optical Add/Drop Multiplexers (ROADMs) to broadcast idle tone wavelengths in order to maintain optical power at the set of idle tone wavelengths throughout the optical communication system.

29. The network controller of claim 28 wherein the minimum spacing between neighboring idle tone wavelengths of the set is no more than the minimum expected spectral hole burning characteristics of erbium doped fiber amplifiers used in the OCS.

30. The network controller of claim 29 wherein the RSA is further configured such that configuring each ROADM further comprises configuring any ROADM which receives the same idle tone from more than one direction to apply filtering such that the same idle tone is not duplicated on any output optical fiber.

* * * * *

UNITED STATES PATENT AND TRADEMARK OFFICE
CERTIFICATE OF CORRECTION

PATENT NO. : 9,831,978 B1
APPLICATION NO. : 15/250202
DATED : November 28, 2017
INVENTOR(S) : Hamid Mehrvar, Mohammad Mehdi Mansouri Rad and Christopher Janz Page 1 of 1

It is certified that error appears in the above-identified patent and that said Letters Patent is hereby corrected as shown below:

In the Specification

Column 1, Line 56 "On aspect" should read --An aspect--

Column 20, Line 61 "are connected each" should read --are connected to each--

Signed and Sealed this
Sixth Day of February, 2018

Joseph Matal
*Performing the Functions and Duties of the*
*Under Secretary of Commerce for Intellectual Property and*
*Director of the United States Patent and Trademark Office*